(12) United States Patent
Winarski

(10) Patent No.: US 12,013,813 B2
(45) Date of Patent: Jun. 18, 2024

(54) REGULATING DISTRIBUTED NETWORK GENERATION OF BLOCKCHAIN BLOCKS

(71) Applicant: Tyson York Winarski, Mountain View, CA (US)

(72) Inventor: Tyson York Winarski, Mountain View, CA (US)

(*) Notice: Subject to any disclaimer, the term of this patent is extended or adjusted under 35 U.S.C. 154(b) by 1141 days.

(21) Appl. No.: 15/900,763

(22) Filed: Feb. 20, 2018

(65) Prior Publication Data

US 2019/0258971 A1 Aug. 22, 2019

(51) Int. Cl.
*G06F 16/00* (2019.01)
*G06F 11/07* (2006.01)
(Continued)

(52) U.S. Cl.
CPC ........ *G06F 16/122* (2019.01); *G06F 11/0709* (2013.01); *G06F 16/2365* (2019.01);
(Continued)

(58) Field of Classification Search
CPC ...... G06F 21/64; G06F 16/2246; G06F 16/27; G06F 21/33; G06F 11/1004; G06F 11/3034; G06F 16/137; G06F 16/1824; G06F 16/214; G06F 16/244; G06F 21/10; G06F 21/105; G06F 21/31; G06F 21/44; G06F 21/53; G06F 21/57; G06F 21/602; G06F 21/604; G06F 21/606; G06F 21/6209; G06F 21/6245; G06F 21/74; G06F 2221/2107; G06F 2221/2145; G06F 8/65; G06F 9/4401; G06F 9/545; G06F 21/62; G06F 21/645; G06F 16/13; G06F 16/176; G06F 21/6227; G06F 40/166; G06F 16/28; G06F 2009/45579; G06F 2009/45587; G06F 2009/45595; G06F 9/45558; G06F 16/182; G06F 16/86; G06F 16/1805; G06F 11/1451; G06F 11/1464; G06F 11/1474; G06F 16/128; G06F 16/2228; G06F 16/2255; G06F 16/2365; G06F 16/2455; G06F 7/14; G06F 15/177; G06F 16/258; G06F 16/2379; G06F 21/6218; G06F 3/0619; G06F 8/70; H04L 2209/38; H04L 2209/56; H04L 9/3239; H04L 9/50; H04L 9/0618;
(Continued)

(56) References Cited

U.S. PATENT DOCUMENTS

2017/0046698 A1* 2/2017 Haldenby .......... G06Q 20/4016
2017/0116693 A1* 4/2017 Rae .................... H04L 9/3236
(Continued)

FOREIGN PATENT DOCUMENTS

WO 2018037148 A1 3/2018
WO 2018111295 A1 6/2018
(Continued)

*Primary Examiner* — Shyue Jiunn Hwa
(74) *Attorney, Agent, or Firm* — The Winarski Firm, PLLC

(57) ABSTRACT

A system for blockchain project management is disclosed. This system includes a cloud-based software network arbitration guide that manages and controls the project process flow through the use of blockchain. This network arbitration guide monitors project progress and sends out various update and alert messages based upon the progress of the project. A project process flow is designated in the genesis block of the blockchain.

22 Claims, 26 Drawing Sheets

(51) Int. Cl.
  *G06F 16/11*    (2019.01)
  *G06F 16/23*    (2019.01)
  *G06Q 10/06*    (2023.01)
  *G06Q 10/0631*  (2023.01)
  *H04L 9/06*     (2006.01)
  *H04L 9/32*     (2006.01)
  *H04L 67/104*   (2022.01)
  *H04L 9/00*     (2022.01)

(52) U.S. Cl.
  CPC ..... *G06Q 10/06* (2013.01); *G06Q 10/063114* (2013.01); *H04L 9/0637* (2013.01); *H04L 9/3239* (2013.01); *H04L 9/3297* (2013.01); *H04L 67/104* (2013.01); *G06Q 2220/00* (2013.01); *H04L 9/50* (2022.05); *H04L 2209/56* (2013.01)

(58) Field of Classification Search
  CPC .... G06Q 40/04; G06Q 20/401; G06Q 20/382; G06Q 2220/10; G06Q 2220/00; G06N 20/00; G06N 7/01; G06N 3/08
  See application file for complete search history.

(56) References Cited

U.S. PATENT DOCUMENTS

| | | | |
|---|---|---|---|
| 2017/0249482 A1* | 8/2017 | Takaai | H04L 9/3247 |
| 2017/0279818 A1* | 9/2017 | Milazzo | H04L 63/1433 |
| 2017/0352033 A1* | 12/2017 | Buckman | H04L 9/14 |
| 2018/0089041 A1* | 3/2018 | Smith | H04L 9/3239 |
| 2018/0139042 A1* | 5/2018 | Binning | H04L 9/3297 |
| 2018/0158162 A1* | 6/2018 | Ramasamy | G06Q 20/3827 |
| 2018/0197172 A1* | 7/2018 | Coburn | A63F 13/792 |
| 2018/0260921 A1 | 9/2018 | Wagstaff | |
| 2018/0276666 A1* | 9/2018 | Haldenby | G06Q 20/20 |
| 2018/0323963 A1* | 11/2018 | Stollman | G06F 16/86 |
| 2018/0349207 A1* | 12/2018 | Erickson | G06F 40/226 |
| 2019/0180519 A1* | 6/2019 | Hausman | G07B 15/063 |
| 2019/0349733 A1* | 11/2019 | Nolan | H04L 41/0806 |
| 2020/0050595 A1* | 2/2020 | Sun | H04L 9/3239 |

FOREIGN PATENT DOCUMENTS

| | | |
|---|---|---|
| WO | 2019142049 A1 | 7/2019 |
| WO | 2019152750 A1 | 8/2019 |

* cited by examiner

PARTY C STATION GENERATES BLOCK HAVING DATA FROM A, B AND C
1008

THIRD BLOCK 38

THIRD BLOCK DATA 44

| PARTY A DATA | PARTY B DATA | PARTY C DATA |
|---|---|---|
| PARTY A TRANSACTION DATA (PROJECT PROCESS FLOW) <br> - NECESSARY PARTIES <br> - TIME RESPONSE OF PARTIES <br> - DATA FORMAT FROM PARTIES <br> - SEQUENCE OF PARTY INPUT/APPROVALS <br><br> PARTY A CORE DATA <br> - TRIGGERING INFORMATION THAT PRODUCED TRANSACTION <br> - ASSOCIATED DATA | PARTY B TRANSACTION DATA <br><br> PARTY B CORE DATA | PARTY C TRANSACTION DATA <br><br> PARTY C CORE DATA |

FIG. 10

REGULATING DISTRIBUTED NETWORK GENERATION OF BLOCKCHAIN BLOCKS

BACKGROUND

A blockchain is a continuously growing list of records, called blocks, which are linked and secured using cryptography. Each block typically contains a cryptographic hash of the previous block, a timestamp and transaction data. By design, a blockchain is inherently resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority.

Blockchains are secure by design and are an example of a distributed computing system with high Byzantine fault tolerance. Decentralized consensus has therefore been achieved with a blockchain. This makes blockchains potentially suitable for the recording of events, medical records, and other records management activities, such as identity management, transaction processing, documenting provenance, food traceability or voting.

The first work on a cryptographically secured chain of blocks was described in 1991 by Stuart Haber and W. Scott Stornetta. In 1992, Bayer, Haber and Stornetta incorporated Merkle trees to the design, which improved its efficiency by allowing several documents to be collected into one block. In 2002, David Mazières and Dennis Shasha proposed a network file system with decentralized trust: writers to the file system trust one another but not the network in between; they achieve file system integrity by writing signed commits to a shared, append-only signature chain that captures the root of the file system (which in turn is a Merkle Tree). This system can be viewed as a proto-blockchain in which all authorized clients can always write, whereas, in modern blockchains, a client who solves a cryptographic puzzle can write one block. In 2005, Nick Szabo proposed a blockchain-like system for decentralized property titles and his bit gold payment system that utilized chained proof-of-work and timestamping. However, Szabo's method of double-spending protection was vulnerable to Sybil attacks.

Blockchain was conceptualized in 2008 by Satoshi Nakamoto and implemented in 2009 as a core component of Bitcoin's public transaction ledger. The invention of the blockchain for Bitcoin made it the first digital currency to solve the double spending problem without the need of a trusted authority or central server. The bitcoin design has been the inspiration for other applications.

SUMMARY

A system for blockchain project management is disclosed. This system includes a cloud-based software network arbitration guide that manages and controls the project process flow through the use of blockchain. This network arbitration guide monitors project progress and sends out various update and alert messages based upon the progress of the project.

This system includes a distributed network formed of separately identified nodes. A genesis block contains project process flow data and core data. The project process flow data specifies which separately identified nodes are able to create successive blocks in a chain based on the genesis block. The project process flow data specifies an order in which the separately identified nodes are able to create successive blocks in a chain based on the genesis block. The project process flow data specifies empty ledger entries requiring data entry from the separately identified nodes. The project process flow data identifies a specific type of data to be entered into the empty ledger entries requiring data entry from the separately identified nodes.

A second block in the chain after the genesis block includes a hash of the genesis block, second block core data, and a hash of the second block. The second block is generated by the node specified by the project process flow data for generating the second block. The second block core data includes data of the type specified by the project process flow data of the genesis block to complete the empty ledger entry. The system also includes a completion block. The completion block forms an end block on the chain. The completion block is generated when a project process flow specified by the project process flow data is completed, thereby identifying the completion of the project process flow. One of the nodes generates the genesis block, which is distributed to all other nodes.

The system for blockchain project management may also include a Network Arbitration Guide (NAG) in data communication with each node. The NAG executes the project process flow data to control which separately identified nodes are able to create successive blocks in the chain based on the genesis block. The NAG executes the project process flow data to control the order in which said the separately identified nodes are able to create successive blocks in the chain based on the genesis block. In one embodiment, the NAG is a cloud-based application accessible through a graphical user interface (GUI) at each node of said distributed network. In another embodiment, the NAG is a graphical user interface (GUI) that is in communication with a central system that includes a cloud accessible server and database store. The NAG monitors the progress of the separately identified nodes completing the empty ledger entries with data specified by the project process flow data based on a time period specified within the genesis block. The NAG sends a targeted alert message to a failure node that does not complete the empty ledger entries with data specified by the project process flow data within the time period. The NAG generates a failure block to append to the chain when any of the separately identified nodes fails to complete the empty ledger entries with data specified by the project process flow data within the time period specified within the genesis block. The genesis block is generated upon the occurrence of a triggering event from a digital or analog signal produced by a hardware device. The hardware device may be a medical device, a warehouse storage device, a construction device, a control loop feedback mechanism, or an electro-mechanical control system.

A method for blockchain project management within a distributed network having separately identified nodes is disclosed. This method includes generating a genesis block having core data and project process flow data. The project process flow data specifies which separately identified nodes are able to create successive blocks in a chain based on the genesis block. The project process flow data specifies an order in which the separately identified nodes are able to create successive blocks in a chain based on the genesis block. The project process flow data identifies a specific type of data to be entered into the empty ledger entries requiring data entry from the separately identified nodes. The system distributes the genesis block to the separately identified nodes.

This method for blockchain management also includes generating a second block with a second node specified by the project process flow data. Then the method distributes the second block to the separately identified nodes. The second block includes a hash of the genesis block, second block core data, and a hash of the second block. The second block core data is of the type specified by the project process flow data of the genesis block to complete empty ledger entry. This method also includes generating a completion block with a completion node specified by the project process flow data. This method further includes distributing the completion block to the separately identified nodes. The completion block includes a hash of a final block specified by said project process flow data and completion data identifying the end of the process flow specified by said project process flow data.

The method may also include generating a failure block with a failure node specified by the project process flow data. The method then distributes the failure block to the separately identified nodes. The failure block includes a hash of a previous block in the chain and failure data identifying the failure of a process flow specified by the project process flow data. The method may also include controlling the project process flow with a Network Arbitration Guide (NAG). The NAG generates progress data distributed to users via a Graphical User Interface (GUI) showing the progress of execution of the project process flow specified by the project process flow data. The NAG also generates alert messages to be distributed to users via a Graphical User Interface (GUI) when a node fails to generate a block within a specified period of time. Further aspects of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 10 illustrates the data structure of a third block according to the present invention as created by a node;

DETAILED DESCRIPTION

Figure 1:
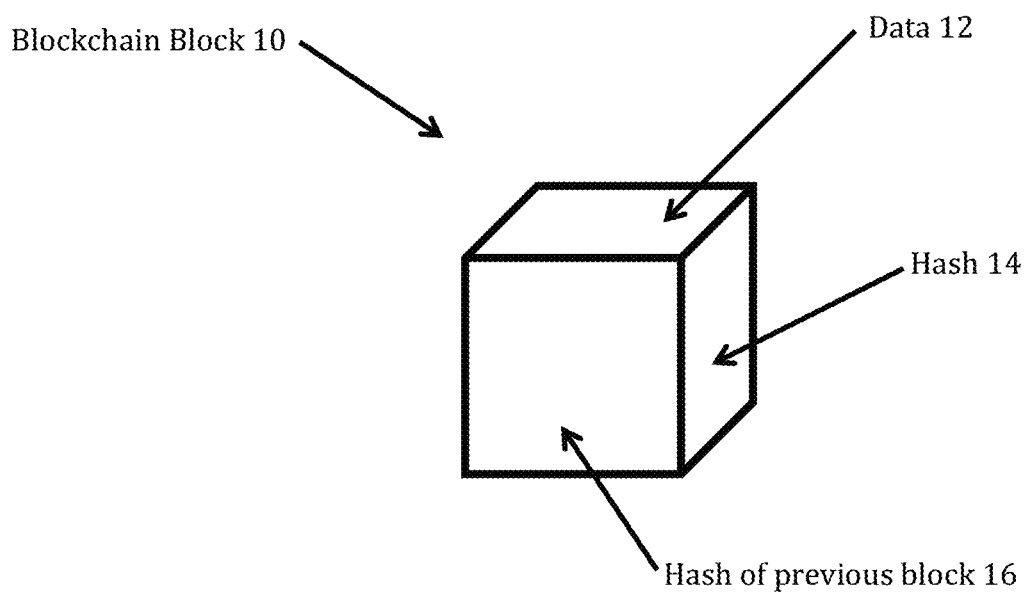
FIG. 1 illustrates a diagram of a blockchain block known in the prior art.

While the invention has been shown and described with reference to a particular embodiment thereof, it will be understood to those skilled in the art, that various changes in form and details may be made therein without departing from the spirit and scope of the invention. FIG. 1 illustrates a diagram of a blockchain block 10 known in the prior art A blockchain is a continuously growing list of records, called blocks 10, which are linked and secured using cryptography.

Figure 2:
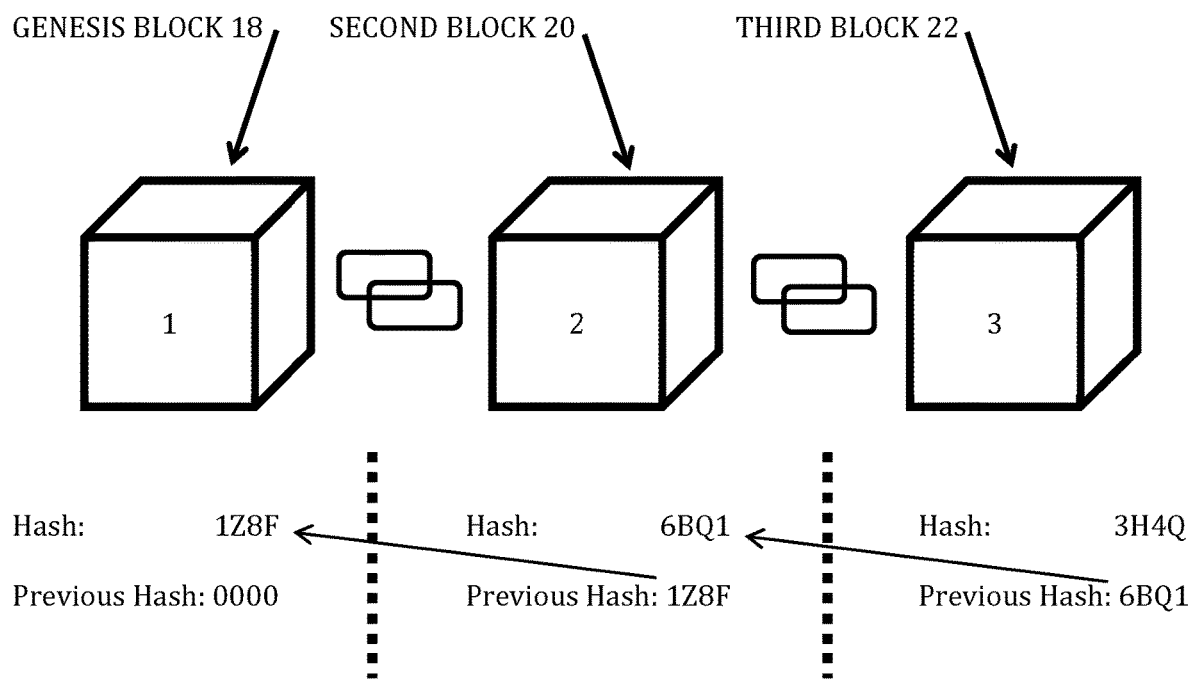
FIG. 2 illustrates a diagram of a blockchain formed of three blocks known in the prior art.

Each block typically has transaction data 12, a hash of the current block 14 and a hash of the previous block 16. By design, a blockchain is inherently resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Data 12 depends on the type of data for the specific application. For example in bitcoin applications, the data includes the amount of the bitcoin value, who the bitcoin is from, and where it is being transferred to. Hash 14 identifies block 10 and all of its contents and is unique like a fingerprint. If any data in block 20 is changed, hash 14 will correspondingly change, thereby revealing the changed data. Such hashes are very useful to determine changes to blocks. Hash of the previous block 14 creates a chain of blocks, thereby rendering the entire chain of blocks secure to tampering. The security of this chain is discussed more with respect to FIG. 2. FIG. 2 illustrates a diagram of a blockchain formed of three blocks 18, 20, 22 known in the prior art Genesis block 18 is the first block in the chain. Genesis block 18 has an exemplary hash of 1Z8F. Genesis block 18 has no prior block in front of it, thus the hash of the previous block is 0000. Second block 20 has an exemplary hash of 6BQ1. Second block 20 includes the previous hash of genesis block 18, which is 1Z8F. Third block includes an exemplary hash of 3H4Q, as well as the previous hash of second block 20 which is 6BQ1. So, third block 22 points to second block 20 which points to genesis block 18, thereby forming a chain. If you tamper with the second block 20, for example, the hash of the second block 20 will change, thereby changing the hashes of all succeeding blocks. This provides a degree of security. To mitigate the possibility that a powerful computer could recalculate the hash of each block, the proof of work mechanism slows down the ability to calculate additional blocks, thereby making the resource consumption to derive new blocks time consuming and impractical. A further safeguard is the fact that all of the blocks in the chain are distributed across a peer-to-peer (P2P) distributed network. When a new block is created, every node on the network gets the block and verifies it Each node then adds the block to its own blockchain. The nodes then communicate through consensus to determine which blocks are valid or not. The consensus procedure then causes tampered blocks to get rejected, while valid blocks are agreed to. In order to tamper with a blockchain distributed across a network, a third party would have to redo the blocks and recalculate the proof of work for every blockchain at more than 50% of the nodes across the network, which is for all effective purposes a full practical barrier to tampering.

Figure 3:
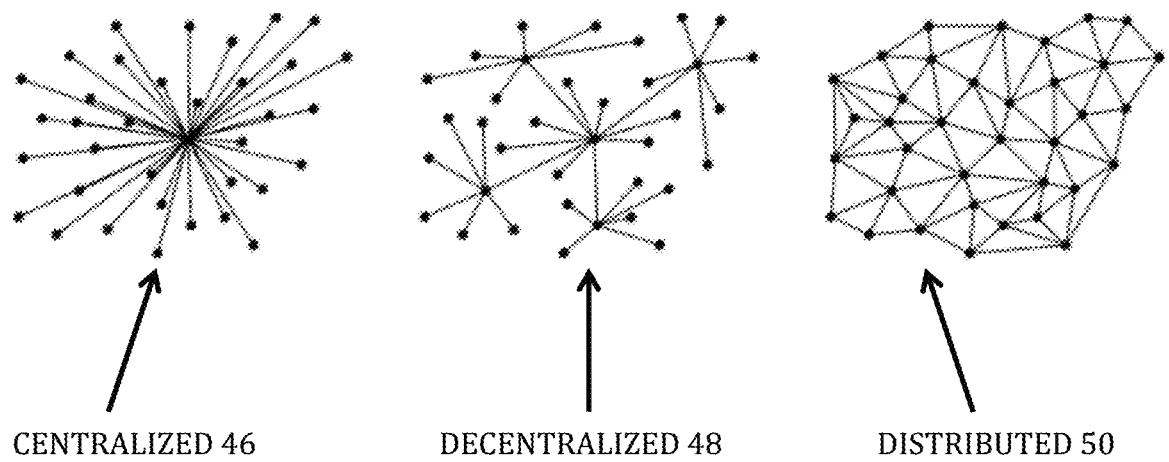
FIG. 3 illustrates diagrams of a centralized network, a decentralized network, and a distributed network known in the prior art.

FIG. 3 illustrates diagrams of a centralized network 46, a decentralized network 48, and a distributed network 50 known in the prior art. A network is a collection of interlinked nodes that exchange information. A node is the most basic part of the network; for example, a user or computer. A link is the connection between two nodes. A server is a node that has connections to a relatively large amount of other nodes. The "traditional" network architecture is the centralized network 46, where all nodes send their data to one central node (a server), which then sends the data to the intended recipient. Then there's the distributed network 50, where there's no central server and each node is connected to various other nodes; data simply "hops" through whichever nodes allow for the shortest route to the recipient. Finally there's the decentralized network 48, which could be characterized as a distributed network 50 of centralized networks 46. When "zoomed out", a decentralized network 48 resembles a distributed network 50, but zooming in on the nodes of this distributed network 50 reveals that the nodes in this network are in fact centralized networks 46, with the central node of each network connected to several other such central nodes. This way, the network does not rely on one single server, but splits the risk by having several such central nodes each manage a limited amount of "end point" nodes. Blockchain technology is generally implemented on a P2P distributed network 50 where each node equally contributes to whether the blockchain is valid or not. Successfully tampering with a blockchain within a distributed network 50 requires the tampering with more than 50% of the nodes within distributed network 50 so that the network will reach consensus that the tampered blockchain is the valid one. On the other hand, centralized 46 or decentralized networks 48 are more liable to be successfully hacked as there is either a single centralized node or a few core nodes only that need to be hacked to alter what is considered to be a valid set of blocks.

Figure 4:
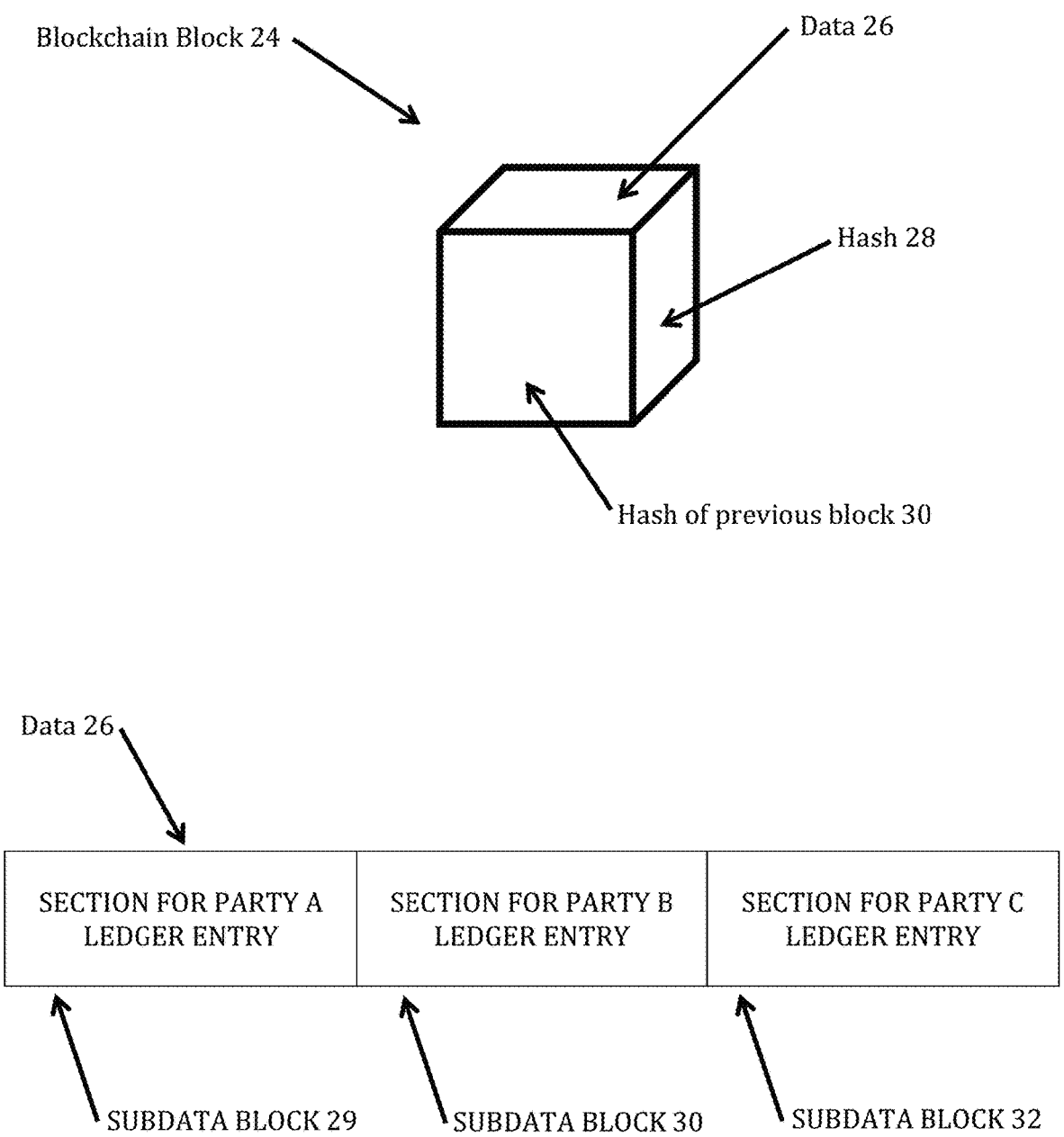
FIG. 4 illustrates a diagram of a blockchain block according to the present invention.

FIG. 4 illustrates a diagram of a blockchain block 24 according to the present invention. The present invention is directed toward an implementation of blockchain technology to facilitate project management. Blockchain block 24 includes data 26, a hash of the current block 28, and a hash of the previous block 30. In this implementation of the invention, data 26 includes an open ledger where different parties have to enter data to complete all of the ledger entries and thus complete the blockchain. By specifying which party has to complete which entry in the open ledger, data 26 has defined a project process flow. For exemplary purposes only, data 26 is shown to have three sub-data blocks 29, 30 and 32. Subdata block 29 includes a ledger section for data from a party A. Subdata block 30 includes a ledger section for data from a party B. Subdata block 32 includes a ledger section for data from a party C. The use of three open ledger sections is exemplary. Data 26 may contain any number of open ledger sections for any number of parties to complete. Some parties may even have to complete multiple open ledger sections. By specifying different parties having to complete different open ledger sections, data 26 has specified a project process flow where Party A at node A on the network would complete open ledger subdata block 29, followed by Party B at node B, and Party C at node C.

Figure 5:
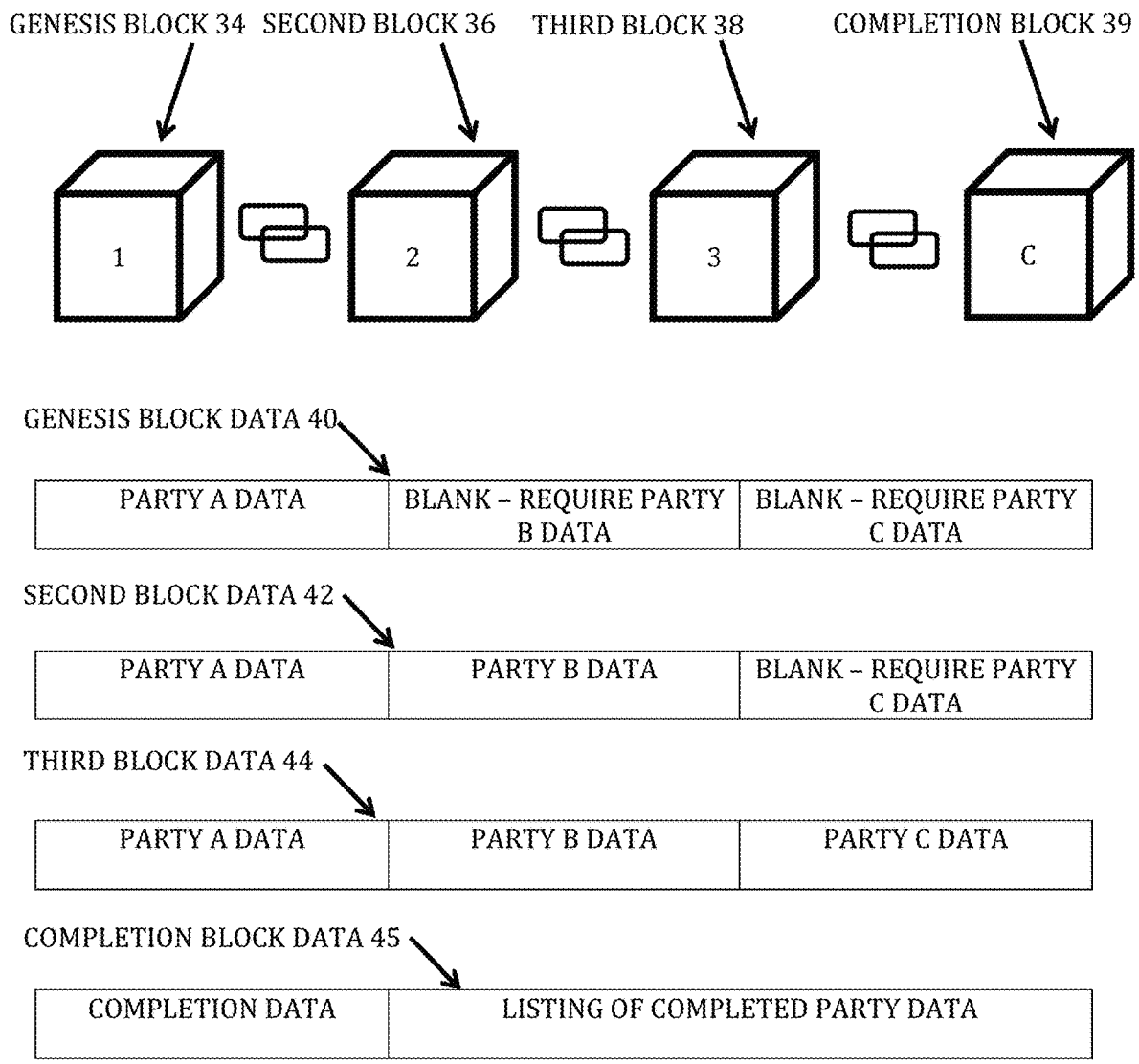
FIG. 5 illustrates a diagram of a blockchain according to the present invention.

FIG. 5 illustrates a diagram of a blockchain according to the present invention having genesis block 34, second block 36, third block 38, and completion block 39. Genesis block 34 has genesis block data 40 as well as a hash of the genesis block. However, the genesis block 34 does not have a hash of the previous block as genesis block 34 is the first block. Second block 36 has second block data 42. Second block 36 has a previous hash of genesis block 34 as well as a hash of second block 36. Third block 38 has third block data 44. Third block 38 has a previous hash of second block 26 as well as a hash of third block 368. Completion block 39 has completion block data 45. Completion block 39 has a prior hash of third block 38 as well as a hash of completion block 39. Completion block 39 is the final block in this project process flow blockchain. Project process flow blockchain is formed of genesis block 34, second block 36, third block 38 and completion block 39. The blocks 34, 36, 38 and 39 of the project process flow blockchain form a blockchain through the incorporation of the hash of the previous block in the chain. The project process flow of the blockchain is defined within genesis block data 40. Genesis block data 40 identifies a series of open ledger entries that have to be completed by adding specified data to them by specified nodes in the network. Genesis block data 40 identifies which nodes have to complete which open ledger entries. In this exemplary figure, genesis block data 40 has party A data included as node A created this initial block. However, node A also specified two additional open ledger entries requiring data entries by party B at node B and party C at node C. Thus, genesis block data 40 has specified which nodes and parties within the network have to provide additional blocks in the blockchain. In this example, genesis block data 40 has also specified an order based upon which nodes and parties within the network have to provide additional blocks in the blockchain through the sequence of open ledger entries. Here, party B data from node B is required after the party A data. Thus, party B at node B generates second block 36 that includes party B data. Subsequently, party C at node C is specified as the third open data entry. Party C at node C generates third block 38 and adds it to the project process flow blockchain. As third block 38 completes all of the blank data ledger entries specified by genesis block data 40, a completion block 39 is generated with completion block data 45. Completion block data 45 specifies the completion of the project process flow and includes completion data as well as a listing of completed party data as listed within the ledger entries.

Figure 6:
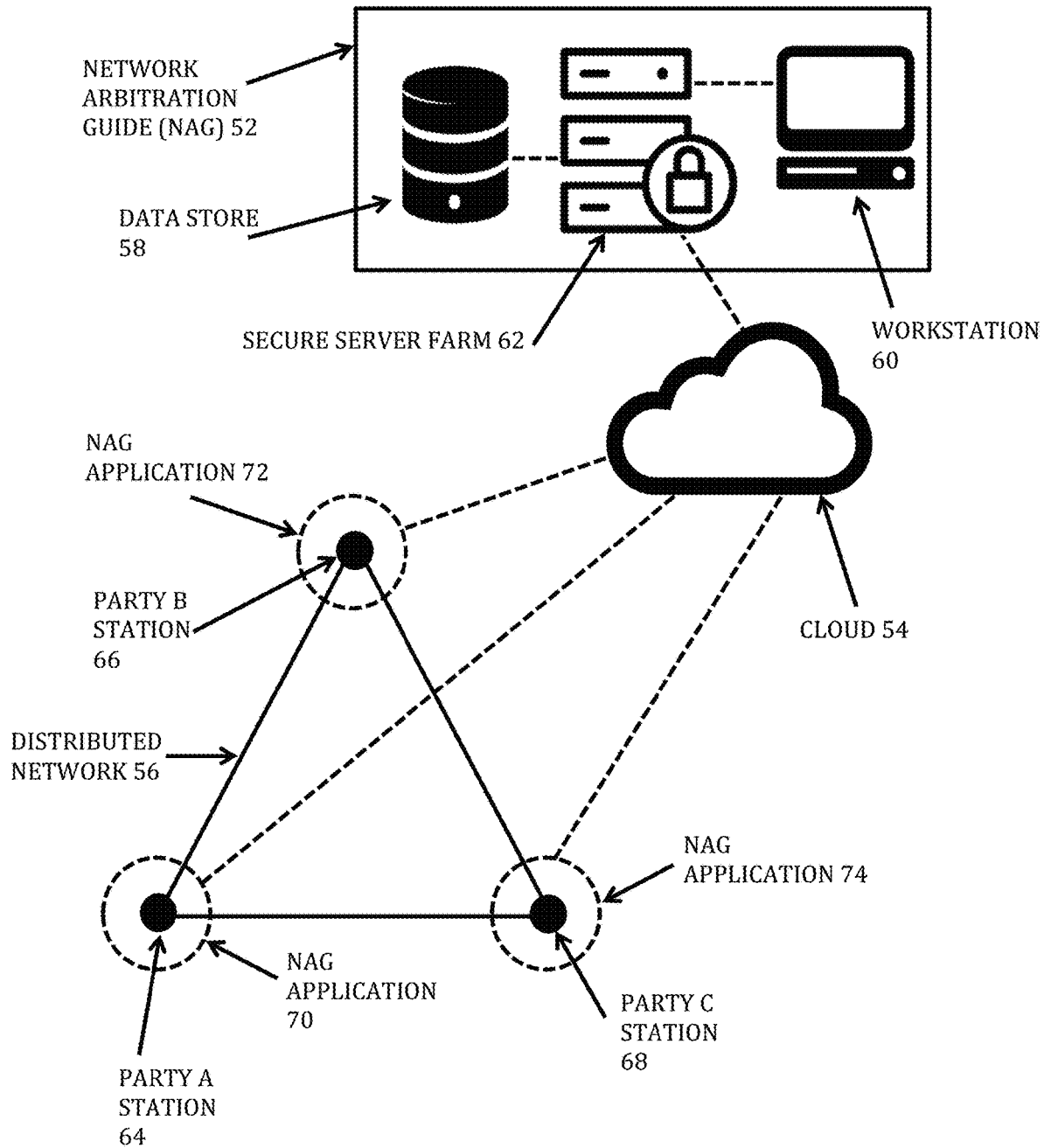
FIG. 6 illustrates a diagram of a distributed network according to the present invention that includes a cloud-based network arbitration guide that is in communication through each node in the network through a local application.

FIG. 6 illustrates a diagram of a distributed network 56 according to the present invention that includes a cloud-based Network Arbitration Guide (NAG) that is in communication through each node 64, 66 and 68 in the network 56 through a local application 70, 72, or 74 respectively. Distributed network 56 in this example is shown having three nodes 64, 66 and 68, which are referred to as Party A station 64, Party B station 66 and Party C station 68. The fact that distributed network 56 is shown having three nodes 64, 66 and 68 is merely done for ease of illustration and is purely exemplary. Distributed network 56 is a distributed Peer-2-Peer network that may have any number of nodes. Distributed network 56 is the preferred embodiment for network 56. However, network 56 may also be a centralized network or a decentralized network. Each node 64, 66 and 68 includes a local application 70, 72 and 74. Local applications 70, 72 and 74 are software agents, web applications, or local applications that are a part of the Network Arbitration Guide 52 through cloud 54. NAG 52 is a computer system and data farm coupled to distributed network 56 through cloud 54. NAG 52 has a data store 58, a secure sever farm 62 and a workstation 60. NAG 52 serves as the central communication point for NAG applications 70, 72 and 74. NAG 52, along with NAG Applications 70, 72 and 74, function to operate on network 56 to facilitate the creation and processing of the project process flow blockchain described in FIGS. 4 and 5. In the example blockchain described in FIG. 5, Party A at Node A 64 generates the genesis block 34 with NAG Application 70. The creation of genesis block 34 includes the creation of genesis block data 40 that specifies the project process flow with the data ledger entries, which in this example included completed ledger entry from Party A, but required data to complete the blank ledger entries from party B at Node B 66 and Party C at Node C 68. NAG Application 70 receives a triggering signal from Node A 64 to generate genesis block along with initial core data from Node A. NAG Application analyzes the core data from Node A (PARTY A DATA in genesis block data 40) using a rule base stored in NAG 52 as to what project process flow should be created resulting in the creation of blank ledger entries for Party B and for Party C. NAG Application 70 then generates genesis block data 40 including the empty ledger entries for Party B and Party C data. NAG Application 70 then coordinates with NAG Applications 72 and 74 at Nodes 66 and 68 to generate second block 36 and third block 38 to acquire the Party B data in second block data 42 and the Party C data in third block data 44. NAG Applications 70, 72 and 74 coordinates the execution of the process data flow specified by genesis block data 40 by determining which Nodes 64, 66 and 68 have to complete which blank ledger entries by creating additional blocks 36 and 38. This process execution by NAG Applications 70, 72 and 74 includes the specification of which specific Nodes 64, 66 and 68 are to create additional blocks 36 and 38 along with a sequential order in which Nodes 64, 66 and 68 are to create additional blocks 36 and 38. The NAG system formed of NAG 52 and NAG Applications 70, 72 and 74 functions in combination to create and execute the project process flow through the creation of blocks 34, 36, 38 and 39 for the blockchain. After all of the nodes 64, 66 and 68 have created the blocks 36 and 38 needed to complete the blank ledger entries, the NAG system, either NAG 52 or one of the NAG Applications 70, 72 or 74 generates completion block 39 that includes completion block data 45 to signify the end of the project process flow created by the NAG system. Thus, as your parents might nag you to complete your homework, the NAG system formed of NAG 52 and NAG Applications 70, 72 and 74 nags network 56 to follow the project process flow and complete the blocks 36 and 38 needed to complete the project process flow blockchain formed by blocks 34, 36, 38 and 39. Generally, the project process flow blockchain will have a finite number of steps requiring a finite number of blocks after which a completion block 39 signifies the end of that project process flow and includes completion data such as a listing of completed party data to serve as a record to specify as an index as to all of the parties/nodes that completed blocks in the blockchain. Such project process flows may encompass any sort of process, such as a product manufacturing process. The project process flow may be a medical treatment process requiring inputs from doctors, patients, insurers, pharmacists, and various specialists and testing centers. The project process flow may be a financial process flow for a complex financial matter such as an audit. These NAG applications 70, 72 and 74 communicate and coordinate with each other across distributed network 56. These NAG applications 70, 72 and 74 also all communicate and coordinate with NAG 52 across cloud 54.

Figure 7:
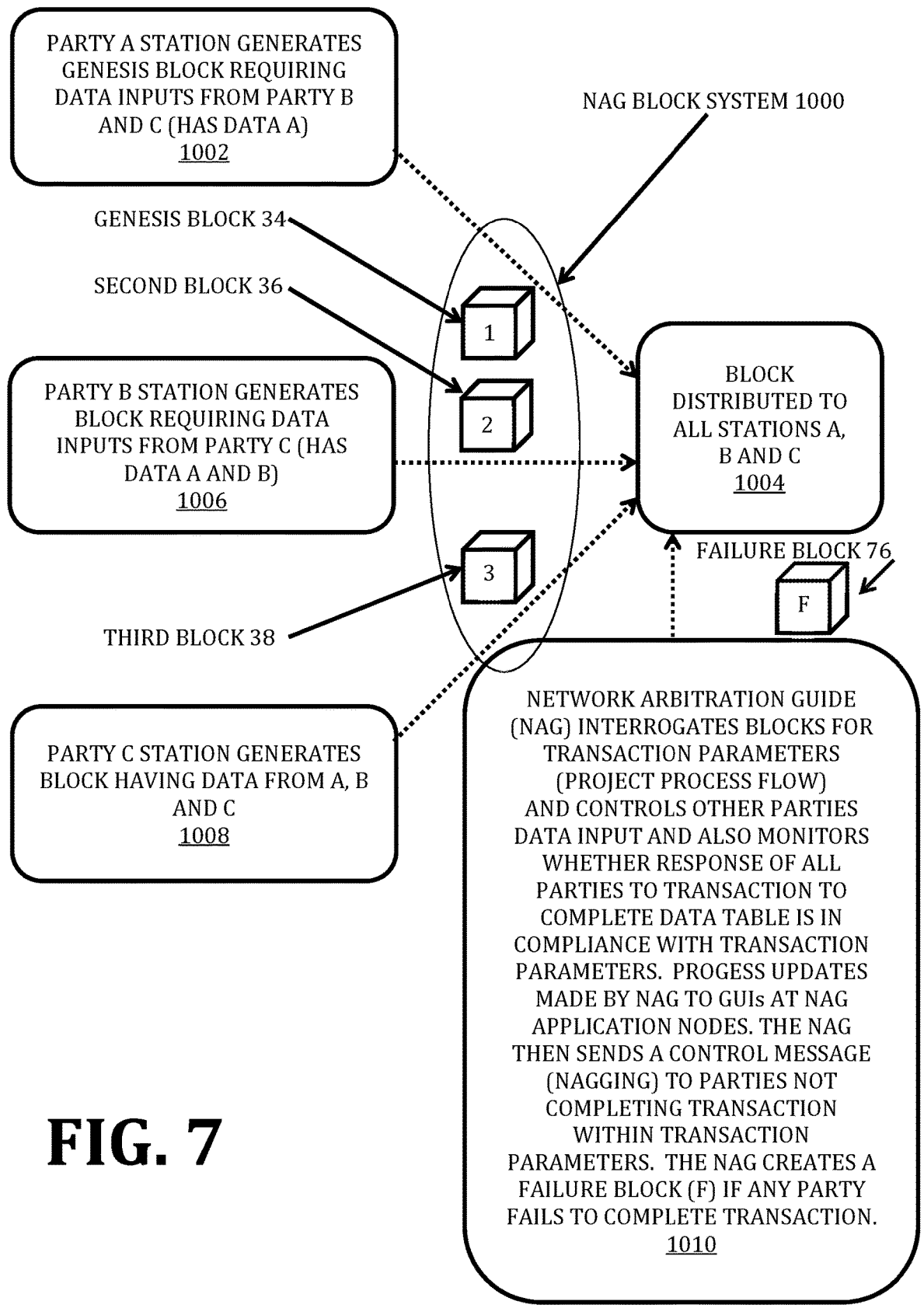
FIG. 7 illustrates a functional diagram of the creation of blocks in a chain by various nodes of a distributed network according to a specified project process flow as controlled by the network arbitration guide.

FIG. 7 illustrates a functional diagram of the creation of blocks 34, 36 and 38 in a blockchain by various nodes of a distributed network 56 according to a specified project process flow as controlled by the Network Arbitration Guide (NAG) system 1000. NAG block system 1000 includes NAG 52 and NAG applications 70, 72 and 74. In step 1002, Party A station 64 (Node A) generates genesis block 34 in coordination with NAG Application 70 having genesis block data 40 requiring data inputs from Node B 66 and Node C 68. NAG system 1000 then distributes genesis block 34 to all nodes within network 56 in step 1004. Thus, NAG system 1000 distributes genesis block to nodes 64, 66 and 68 in step 1004. NAG system 1000 interrogates the genesis block data 40 specifying the project process flow, which is what nodes have to create which blocks in a specific order in order to complete the project process flow and provide data for all blank ledger entries in step 1010. In this example, NAG system determines that Party B at Node B is the next node in the process and directs Node B 66 to generate second block 36 using NAG Application 72. The second block 36 in the chain results in a blockchain that has data from Node A 64 and Node B 66, not Node C 68. Then in step 1004, NAG block system 1000 distributes the second block 36 to all nodes 64, 66 and 68 in network 56. NAG system 1000 then interrogates genesis block data 40 in step 1010 to determine that Node C 68 must complete third block 38 in step 1008 with NAG Application 74. Once third block 38 is created, NAG block system 1000 distributes the third block 38 to all nodes 64, 66 and 68 in network 56 in step 1004. NAG system 1000 is provided to create genesis block 34 along with the project process flow designated within genesis block data 40. NAG system 1000 then interrogates genesis block data 40 for the transaction parameters that specify the project process flow. This project process flow controls which other Nodes 64, 66 and 68 in the network 56 that must create additional blocks and in which order. NAG system 1000 monitors the progress of all of the nodes in the project process flow to determine whether they have created the necessary block with the appropriate data entry within a specified period of time. If any Node within the project process flow has not created the block within a specified period of time, the NAG system 1000 generates a project process flow failure block 76 that is distributed to all nodes 64, 66 and 68 within network 56 in step 1004. Failure block 76 is an alert message to all Nodes in the network 56 that this particular project process flow failed. The failure block 76 includes failure data specifying why the Node in question failed to generate the correct block such as a failure to generate the block in time, a refusal to generate the block, or the inclusion of improper data within the block, or another reason for failure. In the event that any nodes provide incorrect data for their block in the blockchain, NAG system 1000 will monitor the blocks and their core data to ensure that the correct data is provided. If incorrect data is provided, NAG system 1000 will direct that Node to recreate the block to have correct data. NAG Applications 70, 72, and 74 may be provided with data entry fields in a Graphical User Interface (GUI) that include verification logic to ensure that any data entry in that field meets specified rules according to the verification logic to ensure that correct data is provided.

Figure 8:
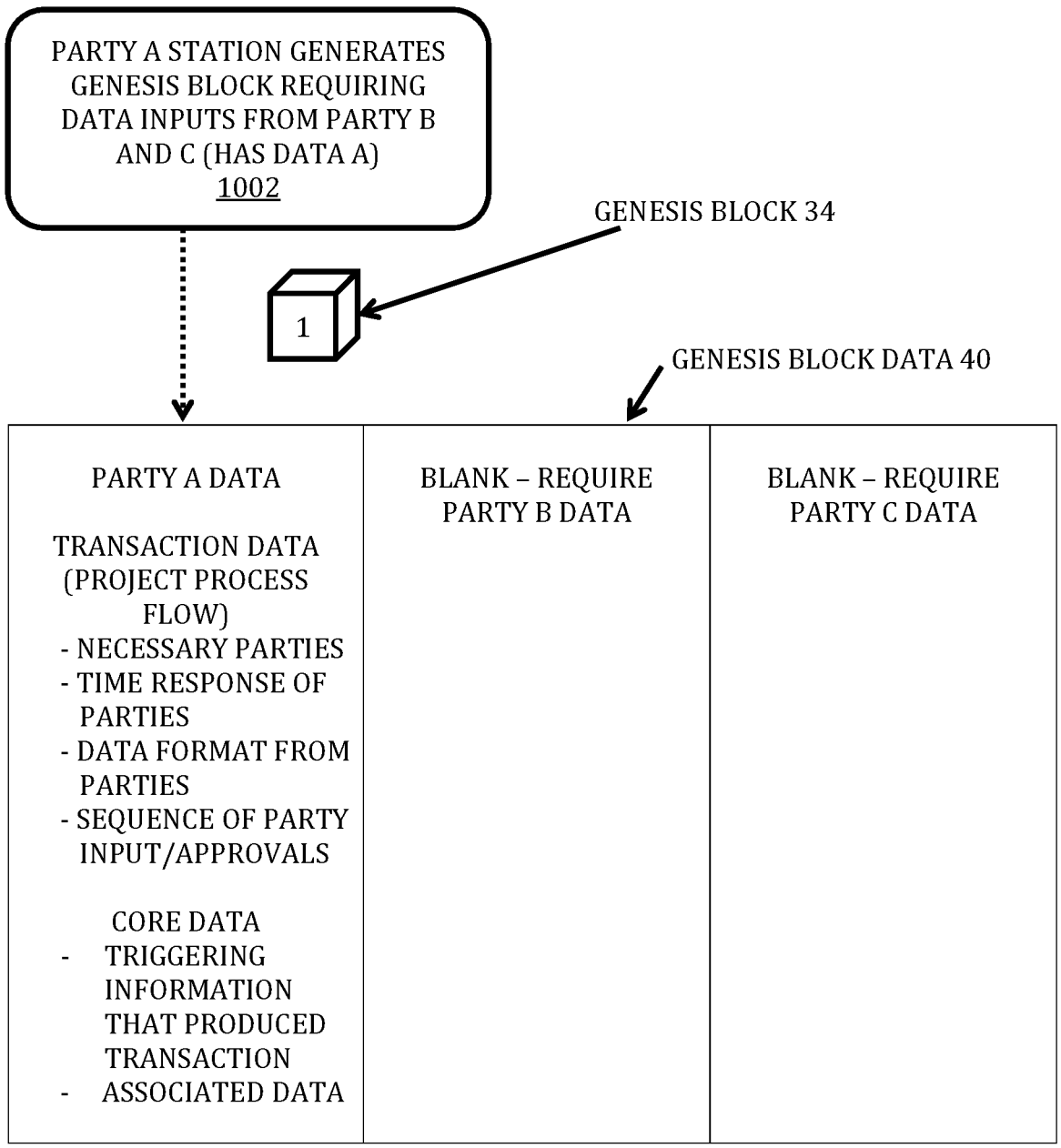
FIG. 8 illustrates the data structure of a genesis block according to the present invention as created by a node.

FIG. 8 illustrates the data structure 40 of a genesis block 34 according to the present invention as created by node 64. In step 1002, Party A at Node A 64 generates genesis block 34 having genesis block data 40. Genesis block data 40 includes in this example three ledger entries, two of which are blank. Party A data is provided, which includes transaction data and core data. The transaction data is project process flow data that specifies which parties/nodes 64, 66 and 68 need to provide additional blocks and in which sequential order. The transaction data may also provide the desired time response for generating a block according to the project process flow. The transaction data may also provide the desired data format required from the various nodes for entry into the blank ledger entries, such as dates, times, financial values, approvals, product information, scientific information, etc. The transaction data may also provide the sequence in which the various nodes generate blocks of data. For example, in a medical process, an insurance company may have to approve payment for a medicine through a block before a pharmacist generates a block to create the prescription. The Party A data also includes core data. This core data includes triggering information from the item that caused the creation of the genesis block. This triggering information can be from a user input or a device input. For example in a medical application, a heart monitor or pacemaker may detect a cardiac event through the use of analog or digital sensors which function as the trigger for generating the genesis block. NAG system 1000 will interrogate this cardiac data and generate an associated project process flow based upon this cardiac event requiring data from doctors, insurers, pharmacists and others to manage the cardiac event Each of these parties generates a block in the block chain to provide necessary medical information such as doctor approvals, insurance approvals, and pharmacist prescriptions. There is then associated data along with the triggering information. This associated data may be related to the triggering data. In this medical application, the triggering event may be a cardiac arrest along with various heart data related to the incident. The associated data may be patient information, identities of their doctors, insurers and pharmacists, and other related information. NAG Application 70 will interrogate the core data with NAG 52 to determine what project process flow is appropriate from a stored rule base of project process flows and then create additional blank ledger entries in a specific order that require completion by other parties/nodes in the network 56. In this example, those blank ledger entries are party B data and party C data. It is contemplated that each party/node that is required to provide additional information is a different entity in a project process flow, such as a doctor, patient, hospital, insurer, pharmacist, testing center information within a medical project process flow. Each party provides its necessary information according to a project process flow as specified in the genesis block through the addition of additional blocks, each of which is distributed to all nodes in the network. The NAG system 1000 alerts specific nodes in the network 56 as to whether or not they have to take action in relation to the project process flow through a Graphical User Interface (GUI).

Figure 9:
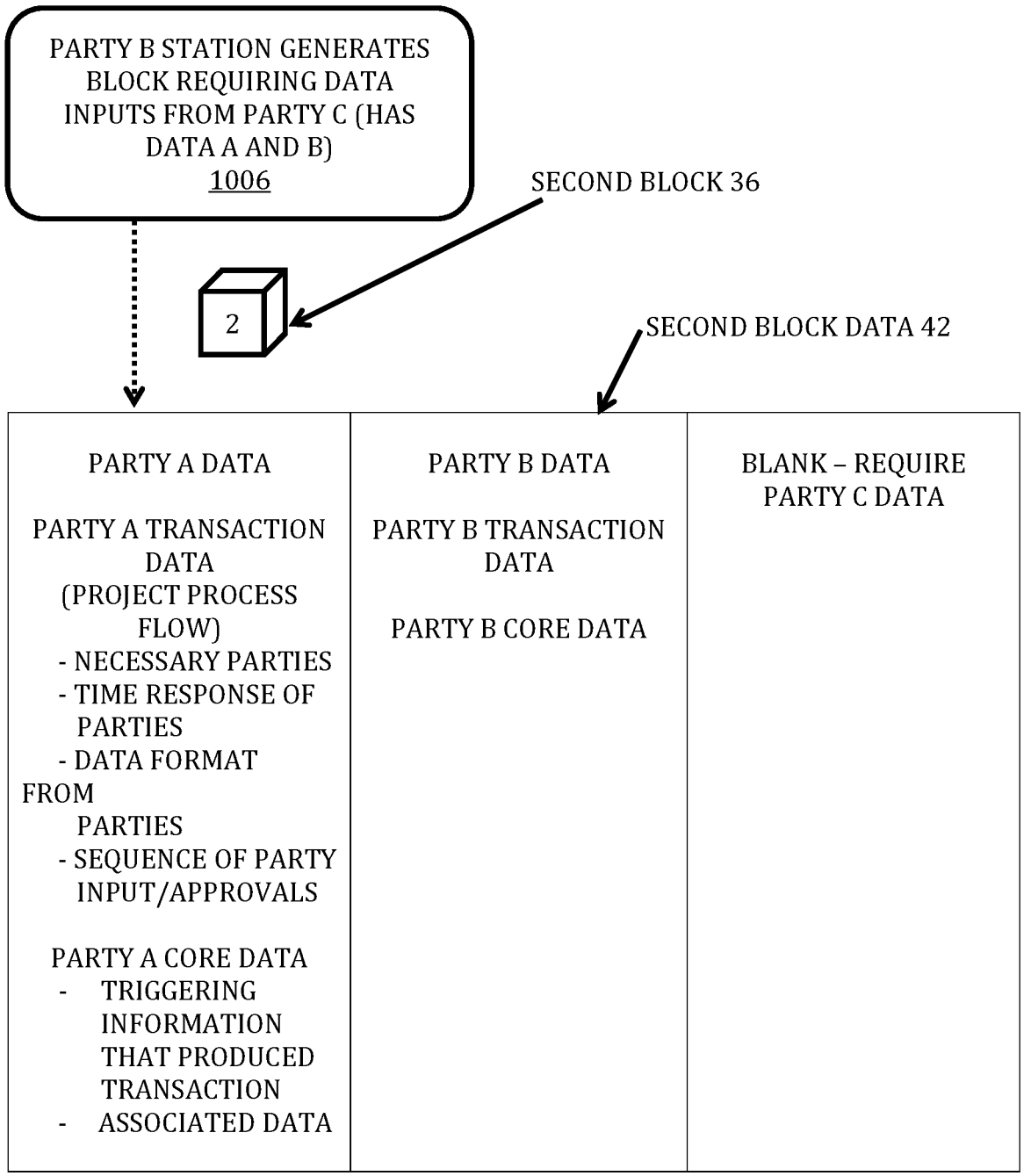
FIG. 9 illustrates the data structure of a second block according to the present invention as created by a node.

FIG. 9 illustrates the data structure of a second block 36 according to the present invention as created by node B 66. In this example, second block 36 includes second block data 42. Second block 36 is created by Node B in step 1006 by NAG system 1000. Second block data 42 may optionally include party A data. Second block data 42 does include Party B data which includes Party B transaction data and Party B core data. Party B may add to or modify the project process flow through the inclusion of Party B transaction data. For example, in a medical application, the project process flow and change depending upon the response of an insurer as to whether they approve a medication, reject a medication, or require a substitute generic medication. Party B may then also add core data required for entry into the blank data ledger entry specified in genesis block data 40. Second block data 42 may also optionally include a blank ledger entry for party C data. In this example, each succeeding block in the blockchain is conceived to have an entire record of the entire project process flow data within each block. This embodiment means that NAG system 1000 only has to look at the most recent block to ascertain the data of the overall process flow. However, in the alternative, each succeeding block after the genesis block may include data related to that node only. For example, in the genesis block 34, genesis block data 40 may include party A data and specify the need for party B data. Second block 36 may then have second block data 42 that includes that party B data only.

FIG. 10 illustrates the data structure of a third block 38 according to the present invention as created by node C 68. In step 1008, Node C uses NAG system 1000 to generate third block 38. Third block 38 includes third block data 44. Third block data 44 may optionally include party A data (transaction data and core data) and party B data (transaction data and core data). Third block data 44 does include party C data, which includes party C transaction data and party C core data. Party C may add to or modify the project process flow through the inclusion of Party C transaction data. For example, in a medical application, the project process flow can change depending upon the response of a pharmacist as to whether they approve a medication, reject a medication, or require a substitute generic medication based on allergies or conflicts with other medications. Then, with the creation of third block 38, completion block 39 is created by NAG system 1000 having completion block data 45 as discussed in FIG. 5.

Figure 11:
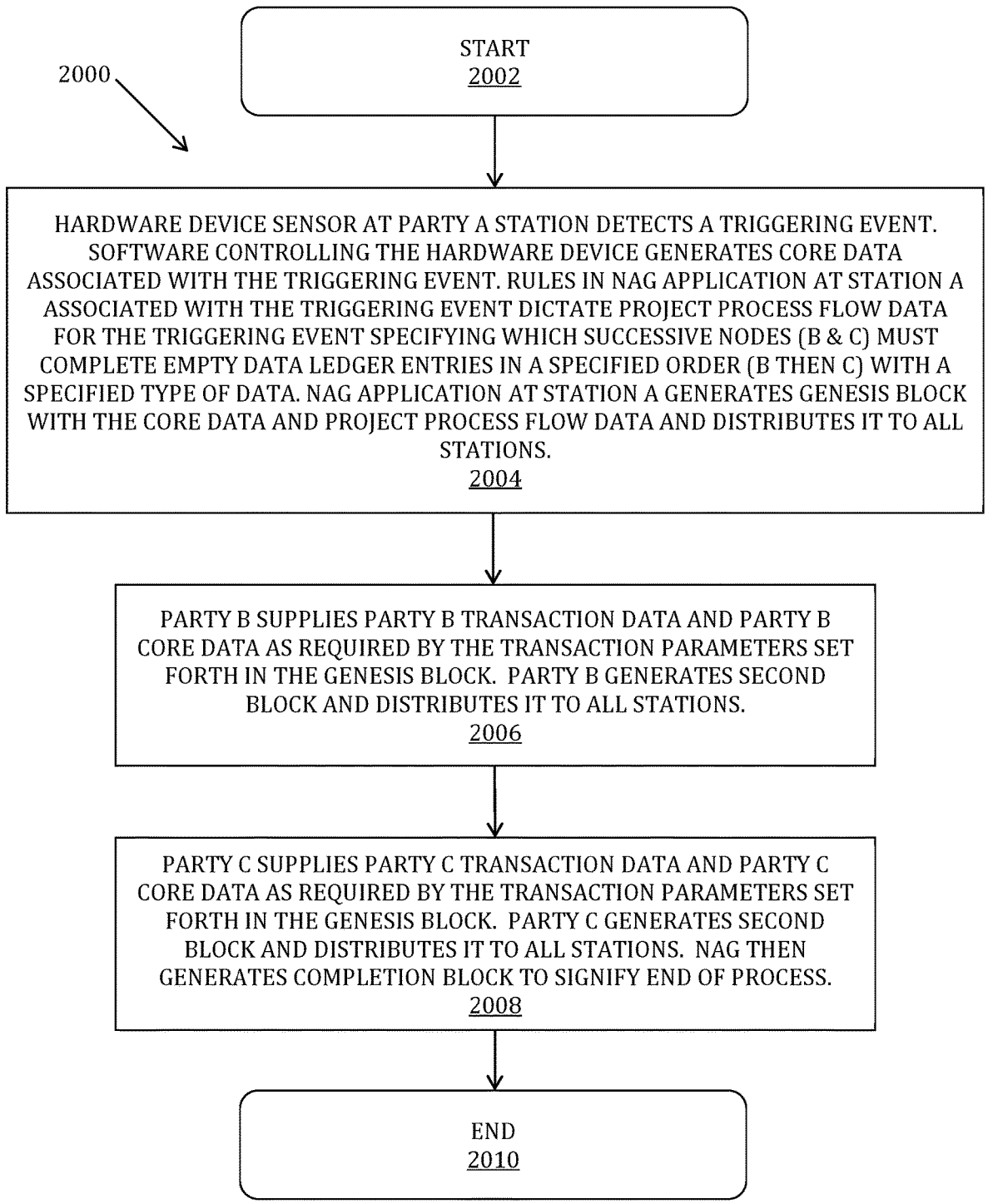
FIG. 11 illustrates a process flow that depicts a process for creating a blockchain where project process flow data dictates which nodes in the network get to create blocks, which contained specified data, in a specified order.

FIG. 11 illustrates a process flow 2000 that depicts a process for creating a blockchain where project process flow data dictates which nodes 64, 66 and 68 in the network 56 get to create blocks 36 and 38, which contained specified data for blank ledger entries, in a specified order. The process begins with START 2002. In step 2004, a hardware device sensor at Node A Party A station 64 detects a triggering event. Software controlling the hardware device generates core data associated with the triggering event. There may also be associated data related to the triggering event. NAG application 70 at node A 64 analyzes the core data and uses stored rules in NAG 52 or NAG application 70 to determine a project process flow for the triggering event specifying additional blank ledger entries that need to be completed to complete the project process flow. This project process flow includes which successive nodes, in this case node B 66 and node C 68, need to complete blocks to add to the blockchain to complete the blank ledger entries in a specified order, which in this case is node B 66 then node C 68. The project process flow will also specify a type of data required for the successive data blocks along with verification logic to be used by successive nodes through their respective GUIs at NAG Applications 72 and 74 to ensure those nodes provide correct data. NAG Application 70 at Node A then generates genesis block 36 with the core data and associated data from the triggering event along with project process flow data and a hash of genesis block 36. NAG Application 70 then distributes genesis block 36 to all nodes in network 56. In step 2006, Party B at Node B supplies Party B transaction data and Party B core data as required by the project process flow transaction parameters specified in the genesis block 36 to complete the empty data ledger entry for Party B. NAG Application 72 at Node B generates second block 38 and distributes it to all nodes of network 56. Then in step 2008, Party C at Node C provides Party C transaction data and core data as required by the project process flow to complete the blank data ledger entry for Party C. NAG Application 74 at Node C generates the third block 38 and distributes it to all nodes in the network. NAG system 1000 then generates a completion block 39 to signify the completion of the project process flow designated by genesis block 34. The process ends with step 2010.

Figure 12:
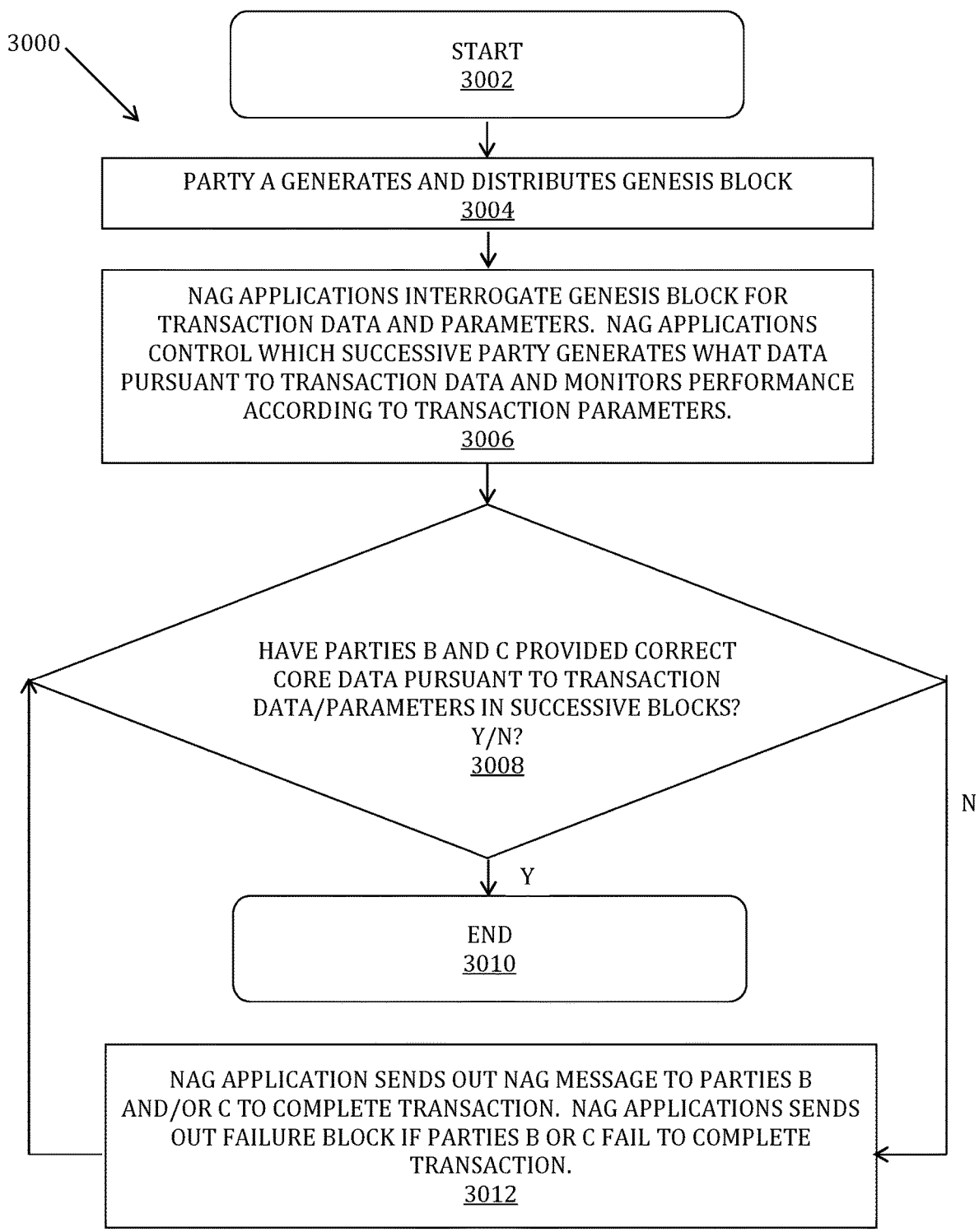
FIG. 12 illustrates a process flow that depicts a process for controlling a project process flow with a network arbitration guide (NAG)

FIG. 12 illustrates a process flow 3000 that depicts a process for controlling a project process flow with a network arbitration guide (NAG) 1000. The process begins with START 3002. In step 3004, Party A generates and distributes genesis block 34 at Node A 64 with NAG Application 70. In step 3006, NAG system 1000 and NAG application 70 in particular interrogates genesis block 36 for the transaction data and parameters specified by NAG 52 which dictate the project process flow specifying what the blank data ledger entries are and which successive nodes have to complete them in which particular order. NAG Applications 70, 72 and 74 control which successive nodes generate successive blocks in the blockchain to complete the project process flow to fill out the blank data ledger entries. Further, NAG Applications 70, 72 and 74 monitor the performance of the various nodes and whether they have produced valid blocks for the blockchain within specified parameters. These parameters can include time parameters and required data parameters. In step 3008, NAG system 1000 determines whether Parties B and Cat nodes B 66 and C 68 have provided correct core data pursuant to transaction data/parameters in successive blocks. If one of the parties has not provided a correct block yet, NAG system 1000 goes to step 3012 and sends out a NAG message to the party or parties who have not completed their blocks as required by the project process flow specified in genesis block 36. This NAG message, which functions to nag the non-responsive nodes, is provided to remind the nodes to complete their blocks for the blockchain. If Node B 66 and/or C 68 fails to complete their block within transaction parameters, NAG application 70, 72 or 74 generates a failure block 76 and distributes it to all nodes within network 56 to alert all nodes in network 56 that the project process flow failed. If Parties B correctly generates second block 36 and third block 38 according to correct transaction parameters as monitored by NAG system 1000, then the process ENDS in step 3010.

Figure 13:
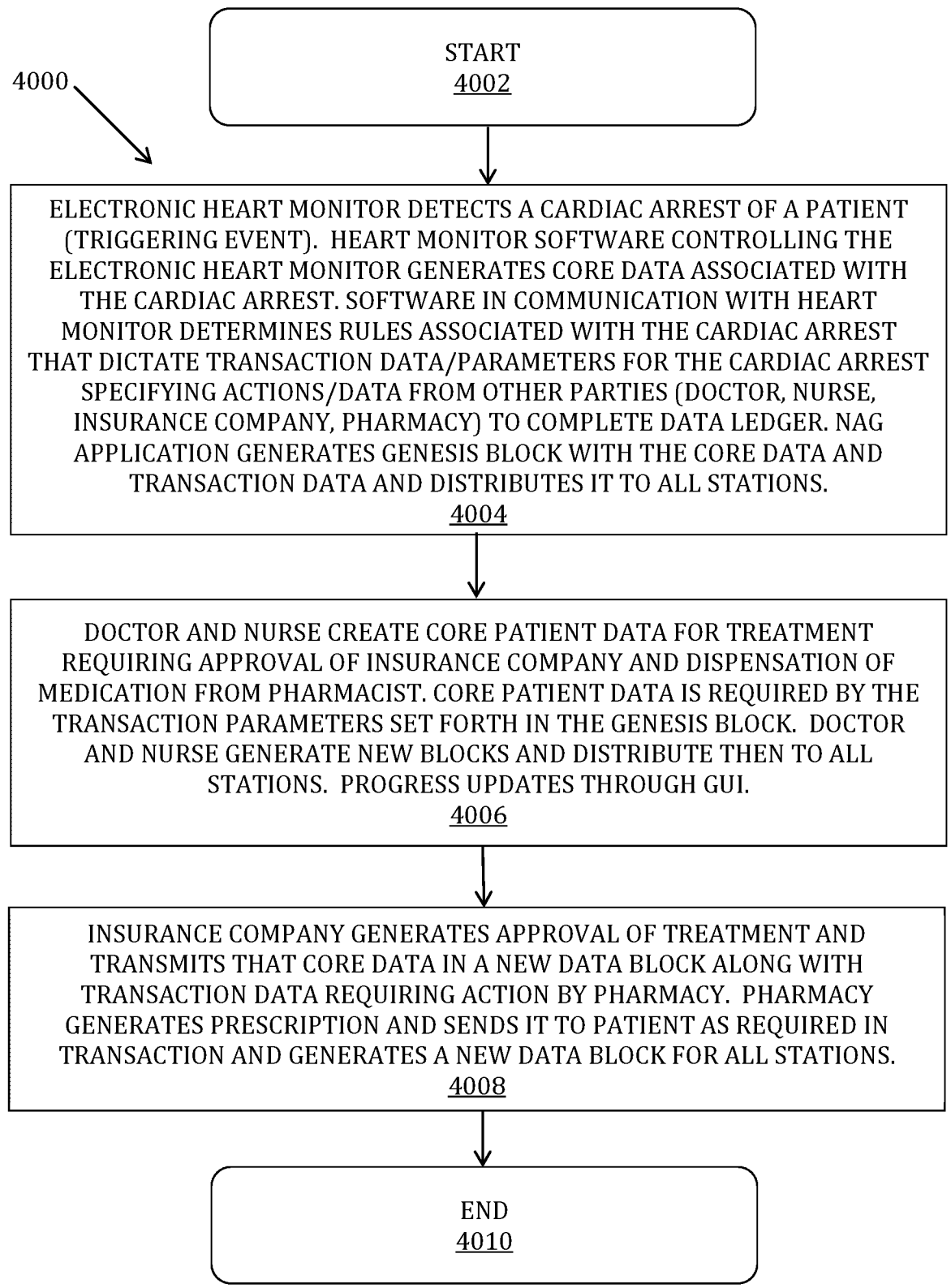
FIG. 13 illustrates a process flow that depicts a process for creating a blockchain in a medical application where project process flow data dictates which nodes in the network get to create blocks, which contained specified data, in a specified order.

FIG. 13 illustrates a process flow 4000 that depicts a process for creating a blockchain in a medical application where project process flow data dictates which nodes 64, 66 and 68 in the network 56 get to create blocks, which contain specified data, in a specified order. The process begins with START 4002. In step 4004, a hardware device detects a cardiac arrest of a patient, which constitutes a triggering event for NAG Application 70, 72 or 74 to generate a genesis block. Heart monitoring software in communication with the hardware device, which may be a heart monitor or pacemaker for example, generates core data associated with the cardiac arrest such as health parameters that include pulse, blood pressure, EKG information and other heart data. NAG Application 70, 72 or 74 is in communication with the heart-monitoring software determines project process flow rules associated with the cardiac arrest that dictate transaction data and parameters for a project process flow required to manage the cardiac arrest, such as necessary actions from doctors, insurance providers, pharmacists and other health care professionals. This project process flow includes blank data ledger entries that these other medical providers have to complete in the form of new blocks in the blockchain to provide the necessary information for completing the medical management of the cardiac arrest. For example, the doctor will have to provide a course of medical treatment that will require approval by an insurance provider and a medication conflict check by the pharmacist NAG application 70, 72 or 74 then generates the genesis block with this project process flow data and core heart cardiac event data and distributes it to all nodes within network 56. In step 4006, the various medical parties that have to complete the blank data ledger entries provide their core data through a GUI at their node. The NAG application at that node then generates a new block in the blockchain that is then distributed to all nodes in the network. The NAG applications provide GUIs that designate which parties and which nodes have to complete which data entries in which specific order. The NAG applications serve as a project process flow software program where blockchain is used as the core data set. The use of blockchain ensures that all parties have a copy of the data and reduces the chances of corrupting the data through hacking by third parties do to the inherent security of blockchain through a distributed network. In this example, in step 4006, a doctor and nurse create core patient data for treatment of the cardiac arrest requiring approval from an insurance company and a pharmacist. The doctor and nurse generate new blocks of data and the NAG application distributes those new blocks to all nodes in the distributed P2P network. In step 4008, the insurance company may approve or reject the treatment through providing an additional block in the blockchain. The approval or rejection of the treatment is the core data in the block generated by the insurance provider. The pharmacy must then run various checks on the approved medication for allergies or conflicts with other medication, which is the core data from the pharmacist. This core data is integrated with a new block in the blockchain from the pharmacist and is distributed to all nodes in the P2P network. Once all blank ledger entries specified by the genesis block have been completed, NAG applications generate a completion block to complete and terminate the blockchain and the process ends in step 4010.

Figure 14:
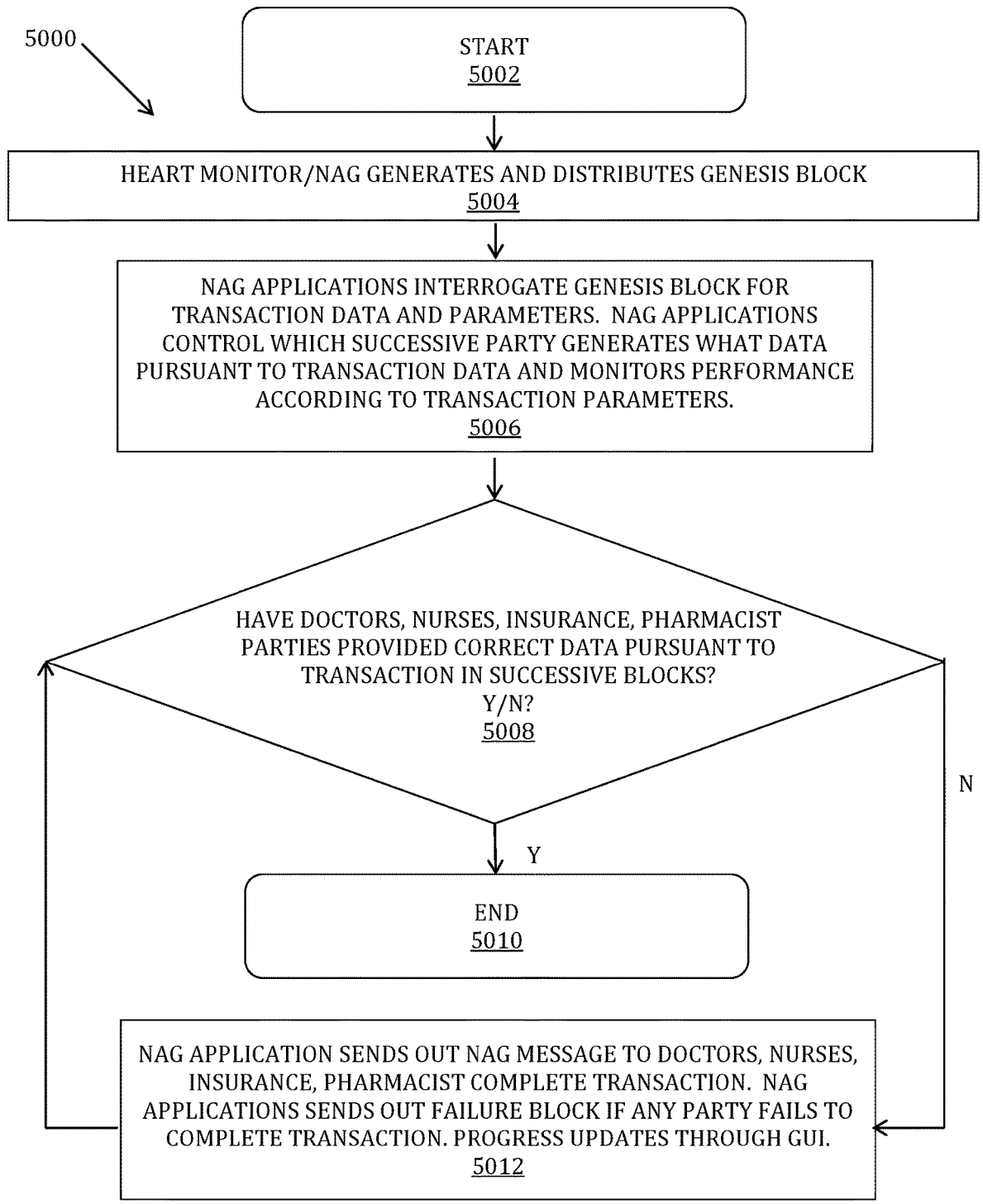
FIG. 14 illustrates a process flow for a medical application that depicts a process for controlling a project process flow with a network arbitration guide (NAG)

FIG. 14 illustrates a process flow 5000 for a medical application that depicts a process for controlling a project process flow with a network arbitration guide (NAG) system 1000. The process begins with START 5002. In step S004, a hardware device heart monitor triggers a NAG application to generate a genesis data block based on a monitored cardiac arrest. In step S006, NAG applications interrogate the genesis block for transaction data and parameters specifying the project process flow. These NAG applications 70, 72 and 74 communicate and coordinate with each other across distributed network 56. These NAG applications 70, 72 and 74 also all communicate and coordinate with NAG 52 across cloud 54. Together NAG applications 70, 72 and 74 together with NAG 52, which all form NAG system 1000, coordinates and executes the project process flow by directing which node creates a block to fill a blank ledger entry in a specified sequence. NAG system 1000 uses GUIs through each NAG Application 70, 72 and 74 to gather data to complete the blank data ledger entries optionally using verification logic in the data fields on the GUIs to ensure the correct entry of data. NAG system 1000 monitors the performance of all of the nodes in network 56 to ensure that all of the nodes specified in the project process flow are creating their blocks for the blockchain within specified transaction parameters, such as time and data content. If any node fails to create a block within transaction parameters, NAG system 1000 alerts all of the nodes in the network 56 by generating failure block 76 and distributing it to all nodes in network 56. In step S008, NAG system checks to see if all parties to the medical transaction, in this case doctors, nurses, insurance and pharmacists have provided correct data pursuant to the transaction parameters in successive blocks. If the nodes have not completed the required blocks needed to fill all blank data ledger entries in the project process flow, then NAG system 1000 sends out a NAG message nagging the various parties at the non-compliant nodes to create their block as required in step S012. If any node fails to create their block, NAG system generates failure block 76. NAG system updates all parties on the progress of the project process flow through a GUI at each NAG application on each node. When all parties have generated their block for the blockchain with correct data on time pursuant to transaction parameters, then the process concludes with END 5010.

Figure 15:
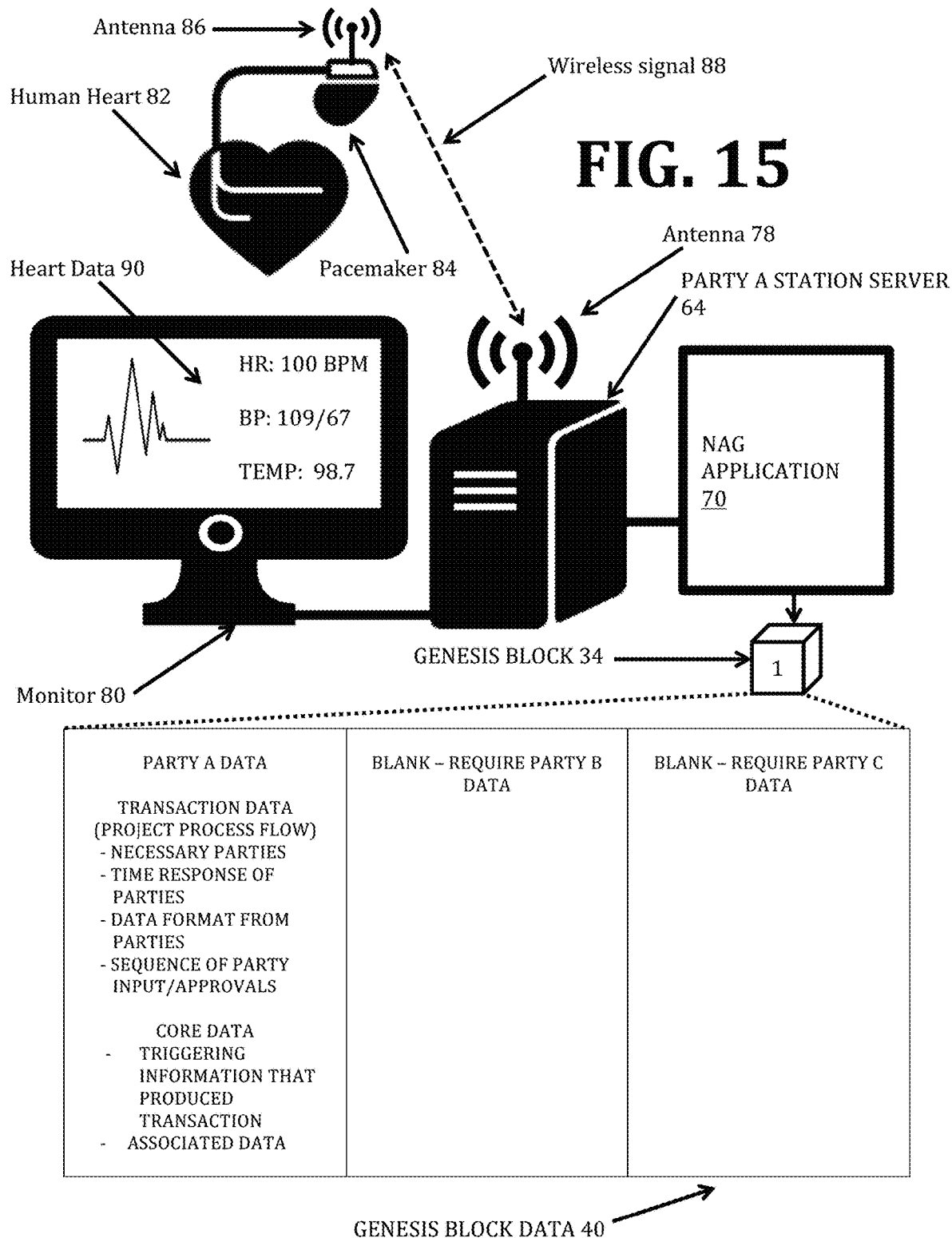
FIG. 15 illustrates a schematic diagram of a node that includes a wirelessly coupled pacemaker in communication with a network terminal and server having a NAG application accessible thereon for creation of a genesis block of a blockchain.

FIG. 15 illustrates a schematic diagram of a node 64 that includes a wirelessly coupled pacemaker 84 in communication with a network terminal 64 and server having a NAG application 70 accessible thereon for creation of a genesis block 36 of a blockchain. This illustration is a further exemplary embodiment of the present invention in conjunction with a medical application. Here, a pacemaker 84 has a wireless antenna 86. Pacemaker 84 monitors a human heart 82. The pacemaker 84 is a hardware device that collects analog and digital information about heart 82. When heart 82 experiences a cardiac event, it is detected by pacemaker 84 and triggers the creation of a genesis block 36 out of need for medical attention for the patient due to the cardiac event. Upon the occurrence of a cardiac event, pacemaker 84 uses antenna 86 to transmit cardiac data to server 64 through antenna 78. Server 64 includes a monitor that displays this cardiac heart data 90 such as heart rate, blood pressure and body temperature. NAG application 70 resides on server 70. Upon the occurrence of the cardiac event, NAG Application 70 generates genesis block 34. NAG Application generates genesis block 34 by utilizing a rule base on NAG Application 70 or NAG 52 to acquire a predesigned project process flow appropriate for the detected cardiac event. This genesis block includes genesis block data 40 as described in FIG. 8.

Figure 16:
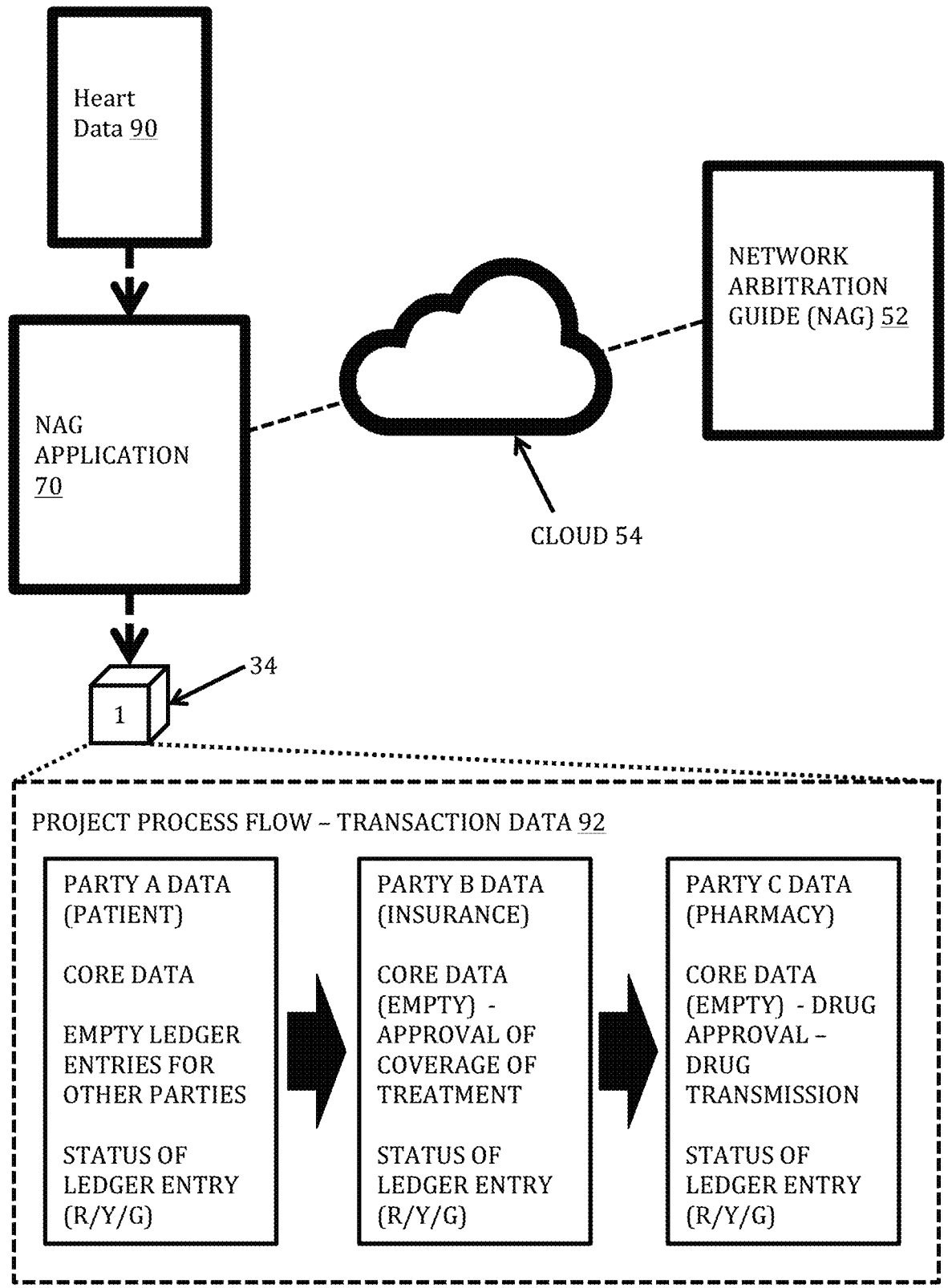
FIG. 16 illustrates the creation of a project process flow-transaction data with a NAG application based upon initial hardware data through use of a cloud-based connection to the NAG.

FIG. 16 illustrates the creation of a project process flow with transaction data with a NAG application 70 based upon initial hardware data 90 through use of a cloud 54 based connection to the NAG 52. Heart data 90 gathered by pacemaker 84 is fed to NAG Application 70. NAG Application communicates with NAG 52 through cloud 54 to determine the correct project process flow data to place in genesis block 34 in order to correctly manage the cardiac event detected by pacemaker 84. This communication may include reference to a database of project process flow rules the match the applicable heart data 90. Once project process flow data has been determined by NAG application 70, NAG application 70 generates genesis block 34 that includes project process flow-transaction data 92. Project process flow-transaction data includes the PARTY A data, core data, and empty ledgers for other parties requiring their input as well as a status of the ledger entry. Status can include a RED (R), YELLOW (Y), or GREEN (G) identifier for various status updates such as GREEN for complete, YELLOW for in progress, and RED fora failed block. The project process flow moves from Party A data to the acquisition of Party B data that includes core data and a status of the ledger entry in RED, YELLOW or GREEN. The use of RED, YELLOW or GREEN for status is merely exemplary. Any kind of status indicator may be used to show the status of the project process flow and of the completion of various data blocks. Next the process moved to the acquisition of Party C data that includes core data and a status of the ledger entry in RED, YELLOW or GREEN. With the completion of the acquisition of Party C data, NAG system 1000 would then generate a completion data block 39. In the medical context, Party A data would be patient data for example, Party B data would be insurance data, and Party C data would be pharmacy data.

Figure 17:
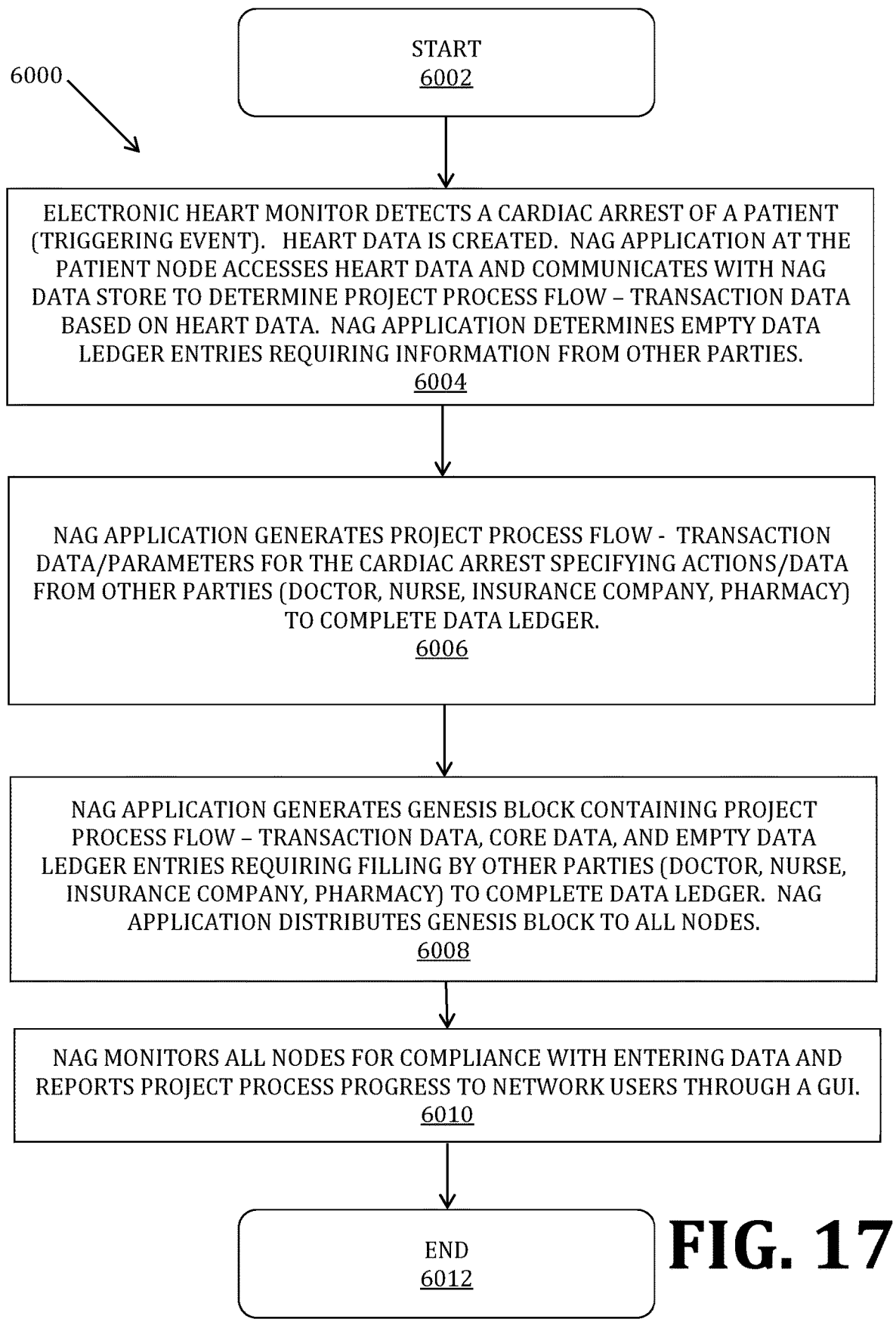
FIG. 17 illustrates a process flow diagram that depicts a process for generating project process flow data, also known as transaction data, and the inclusion of that project process flow data into the genesis block.

FIG. 17 illustrates a process flow diagram 6000 that depicts a process for generating project process flow data, also known as transaction data, and the inclusion of that project process flow data into the genesis block 34. The process begins with START 6002. In step 6004, electronic heart monitor 84 detects a cardiac arrest of a patient, which constitutes a triggering event. This cardiac event generates heart data that is detected by heat monitor 84 and transmitted to node 64. NAG application 70 at node 64 accesses the heart data 90 and communicates with NAG 52 to determine the project process flow-transaction data based on heart data 90 to generate a project process flow to manage the cardiac event for the patient. NAG Application 70 determines what the blank ledger entries are that require filling by other parties in the project process flow. In step 6006, NAG Application 70 generates the project process flow for the cardiac event to complete a data ledger with various blank ledger entries requiring completion by other parties. In step 6008, NAG application 70 generates genesis block 34 containing the project process flow-transaction data along with core heart data 90 and the empty ledger entries requiring filing by other parties, such as doctors, nurses, insurance providers and pharmacies. NAG application 70 then distributes the genesis block 34 to all nodes in network 56. In step 6010, NAG system 1000 monitors all nodes for compliance with entering data and reports project process progress to network users through a GUI at each NAG application. The process then ends in END 6012.

Figure 18:
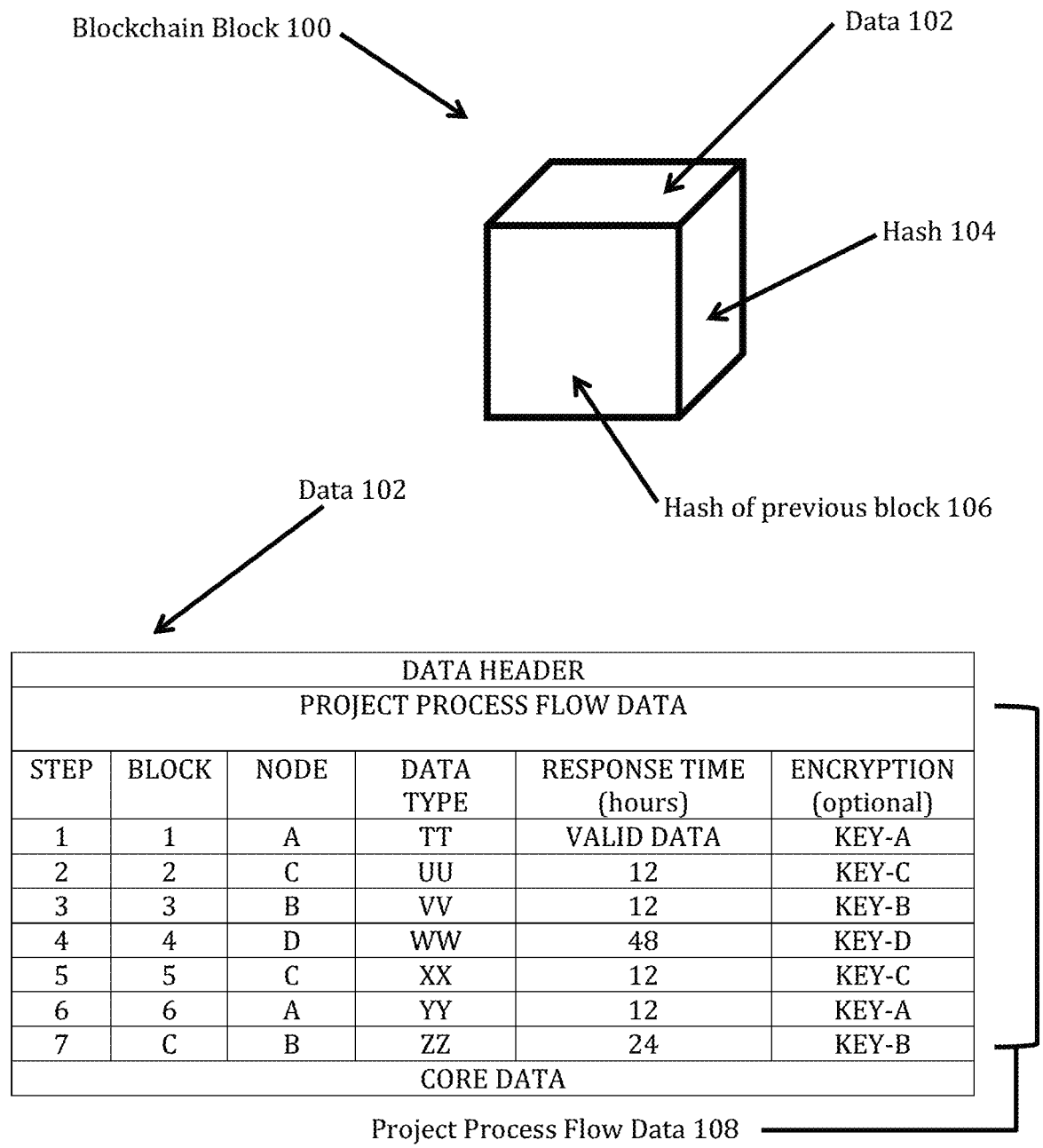
FIG. 18 illustrates a blockchain block according to a preferred embodiment of the present invention.

FIG. 18 illustrates a blockchain block 100 according to a preferred embodiment of the present invention. Block 100 includes data 102, a hash of the previous block 106, and a hash 104 of the current block 100. Data 102 includes a DATA HEADER, PROJECT PROCESS FLOW DATA 108, and CORE DATA. PROJECT PROCESS FLOW DATA 108 specifies a sequential series of project process steps in the first column designating the order in which the blocks listed in column two are produced. In this case, seven steps produce one genesis block, 5 additional blocks containing data to complete empty ledger entries specified in the genesis block, and a completion block formed in step 7. The third column of PROJECT PROCESS FLOW DATA 108 lists the nodes which are to complete the blocks identified in column two. In this case, the Nodes are identified as A-D for a four node network. Some nodes have to complete multiple blocks at different steps in the project process flow. Column 4 specifies a data type required for the data information provided by each node within the block, signified by two letters. This data type may be a time, a date, an approval/rejection, a monetary value, or other specified value. Column 5 of the PROJECT PROCESS FLOW DATA 108 specifies a response time for the creation of the block required in the numbered process step. Finally in column 6, each block may be variously encrypted with the same or a different form of encryption. For example, all blocks may be unencrypted and readable by all parties. However, it may be desirable to encrypt some data so only some parties may read it but not others. Sensitive information may be encrypted and readable by all parties in the network via an encryption key, but the use of encryption protects that information from being accessed by unauthorized parties outside of the distributed network.

Figure 19:
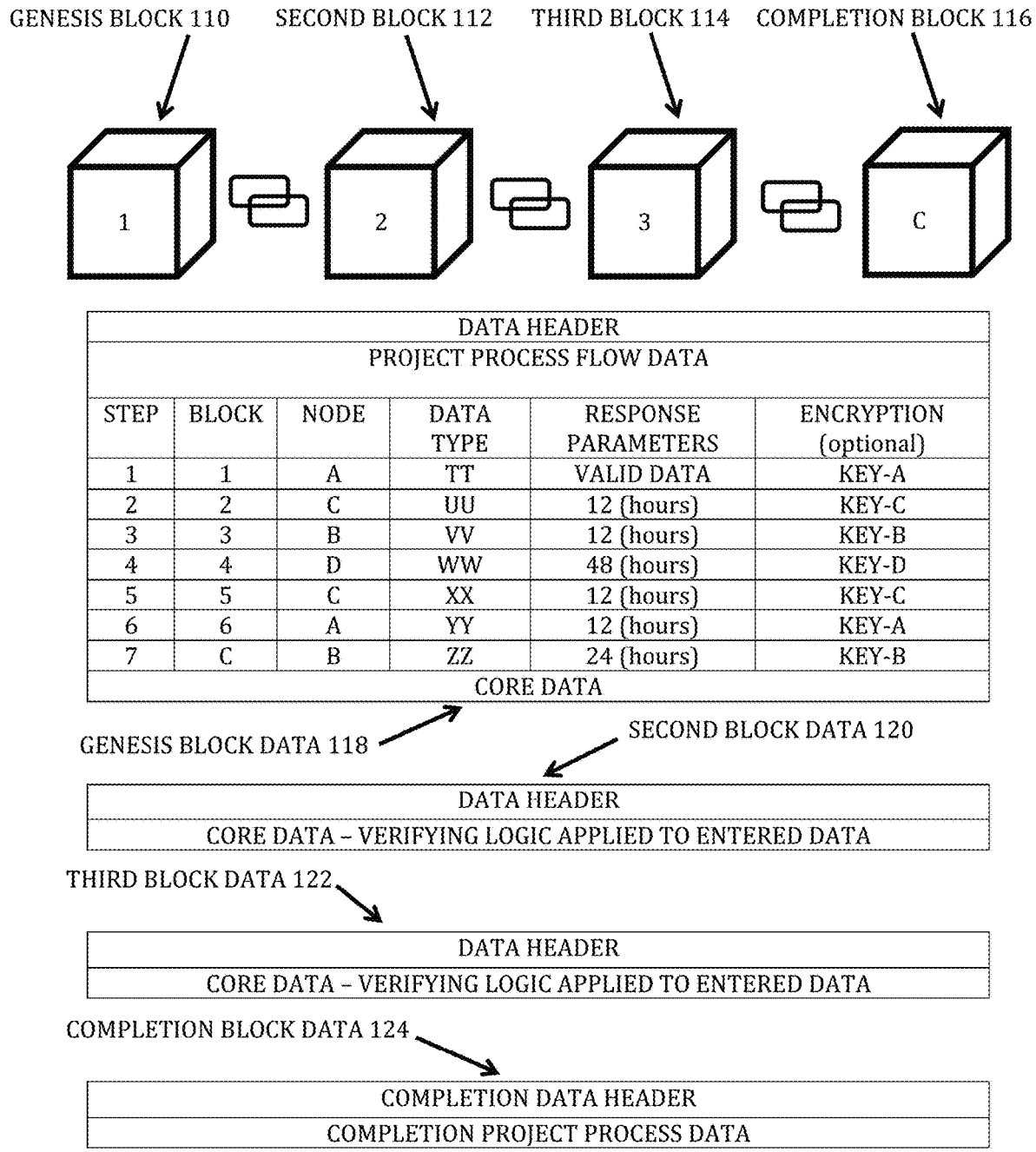
FIG. 19 illustrates a diagram of a blockchain according to a preferred embodiment of the present invention.

FIG. 19 illustrates a diagram of a blockchain according to a preferred embodiment of the present invention. A complete project process flow blockchain is shown having a genesis block 110, a second block 112, a third block 114 and a completion block 116. Second block includes a hash of genesis block 110. Third block 114 includes a hash of second block 112. Completion block 116 includes a hash of third block 114. This use of the hash of the previous block in the succeeding block forms a blockchain. Genesis block 110 includes genesis block data 118. Second block 112 includes second block data 120. Second blocks data 120 includes a data header and core data as well as verifying logic applied to the entered core data. Third data block 114 includes third block data 112. Third block data 122 includes a data header and core data as well as verifying logic applied to the entered core data. Completion block 116 includes completion block data 124. Completion block data 124 has a completion data header and completion project process data.

Figure 20:
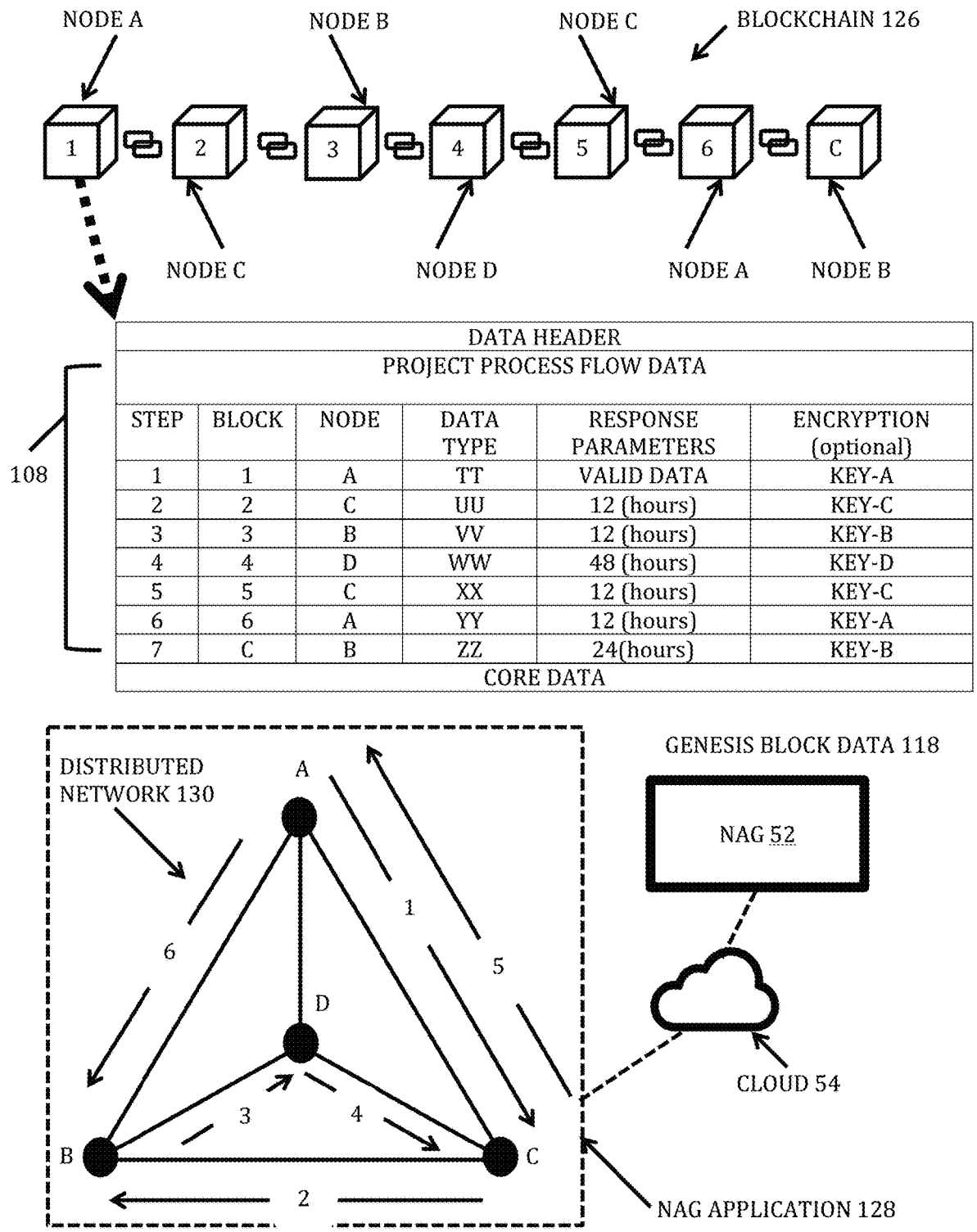
FIG. 20 illustrates a diagram of a blockchain according to a preferred embodiment of the present invention along with a data field of the data header for the genesis block depicting a project process flow for execution on a distributed network.

FIG. 20 illustrates a diagram of a blockchain 126 according to a preferred embodiment of the present invention along with a data field 118 of the data header for the genesis block 110 depicting a project process flow 108 for execution on a distributed network 130. Blockchain 126 is shown as having a genesis block [1], five additional blocks [2-6] and a completion block [C]. These seven blocks are produced according to the seven project process flow steps identified in the project process flow data of genesis block data 118. In this example, in step 1, genesis block 1 is created by node A having a data type TT, which may be optionally created using encryption key A. In step 2, block 2 is created by node C having a data type UU within a specified time of 12 hours that may be optionally encrypted using key-C. In step 3, block 3 is created by node B of a data type VV within a specified time of 12 hours that may be optionally encrypted with key-B. In step 4, block 4 is created by node D with data type WW within a specified time period of 48 hours optionally encrypted with Key-D. In step 5, block 5 is created by node C with data type CC having a response time parameter of 12 hours optionally encrypted with key-C. In step 6, block 6 is created by node A having data type ZZ within a response parameter of 24 hours that may be optionally encrypted by key-B. The different keys are merely exemplary to show that the different blocks may have different encryptions of different levels of encryption. A distributed P2P network 130 is shown having four nodes labeled A, B, C, and D corresponding to the nodes that form blockchain 126 and identified in column 2 of the project process flow data 108. Next to these nodes, various numbered arrows identify the project process flow as it moves from node to node requiring each node to create its block in blockchain 126. After each block is created, it is distributed to each node so that every node in the distributed network 130 has a complete copy of the blockchain 126. NAG application 128 resides on every node of distributed network 130. NAG application 128 communicates with NAG 52 through cloud 54.

Figure 21:
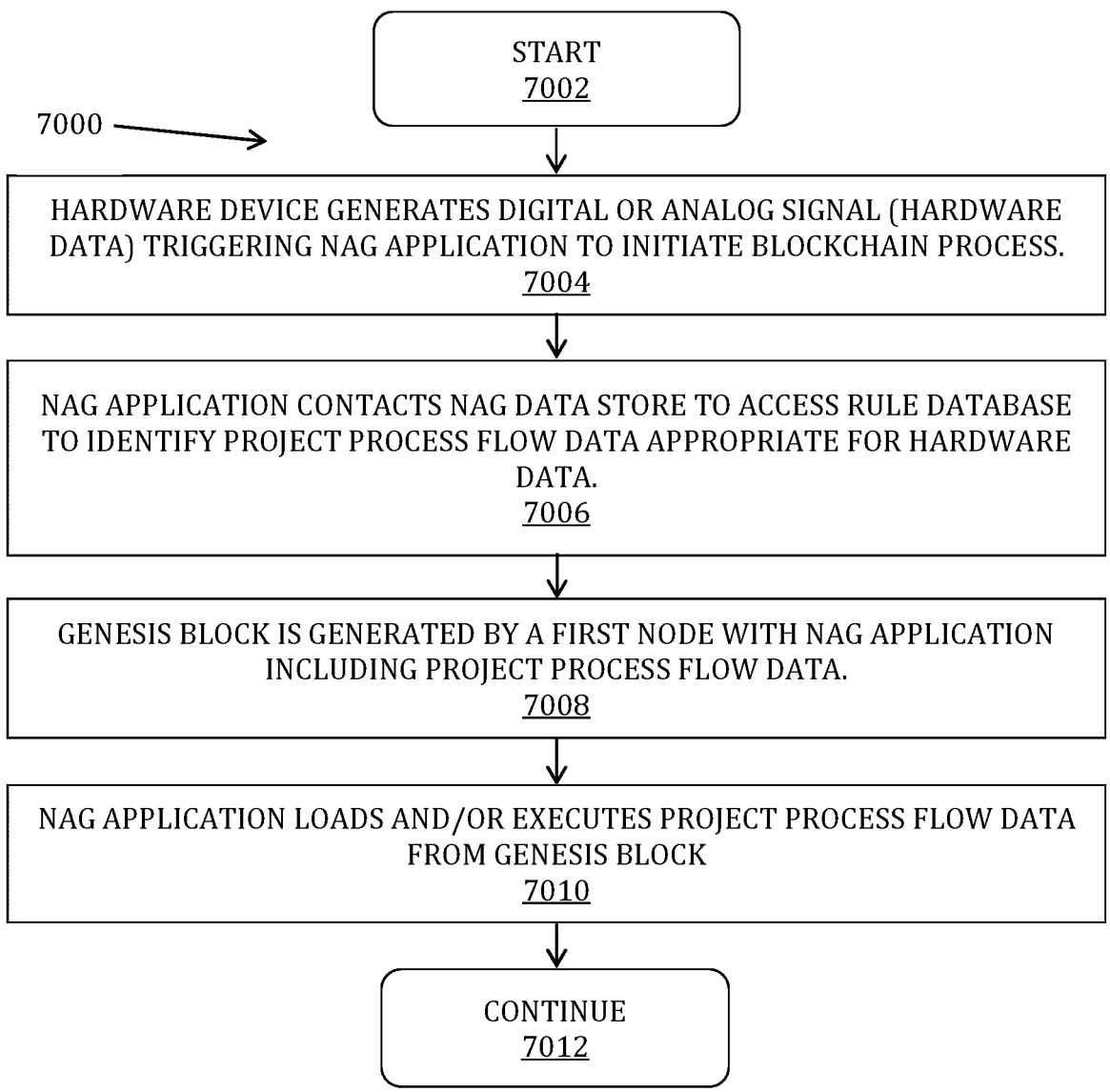
FIG. 21-22 illustrates a flowchart depicting a process for generating project process flow data in a genesis block.
Figure 22:
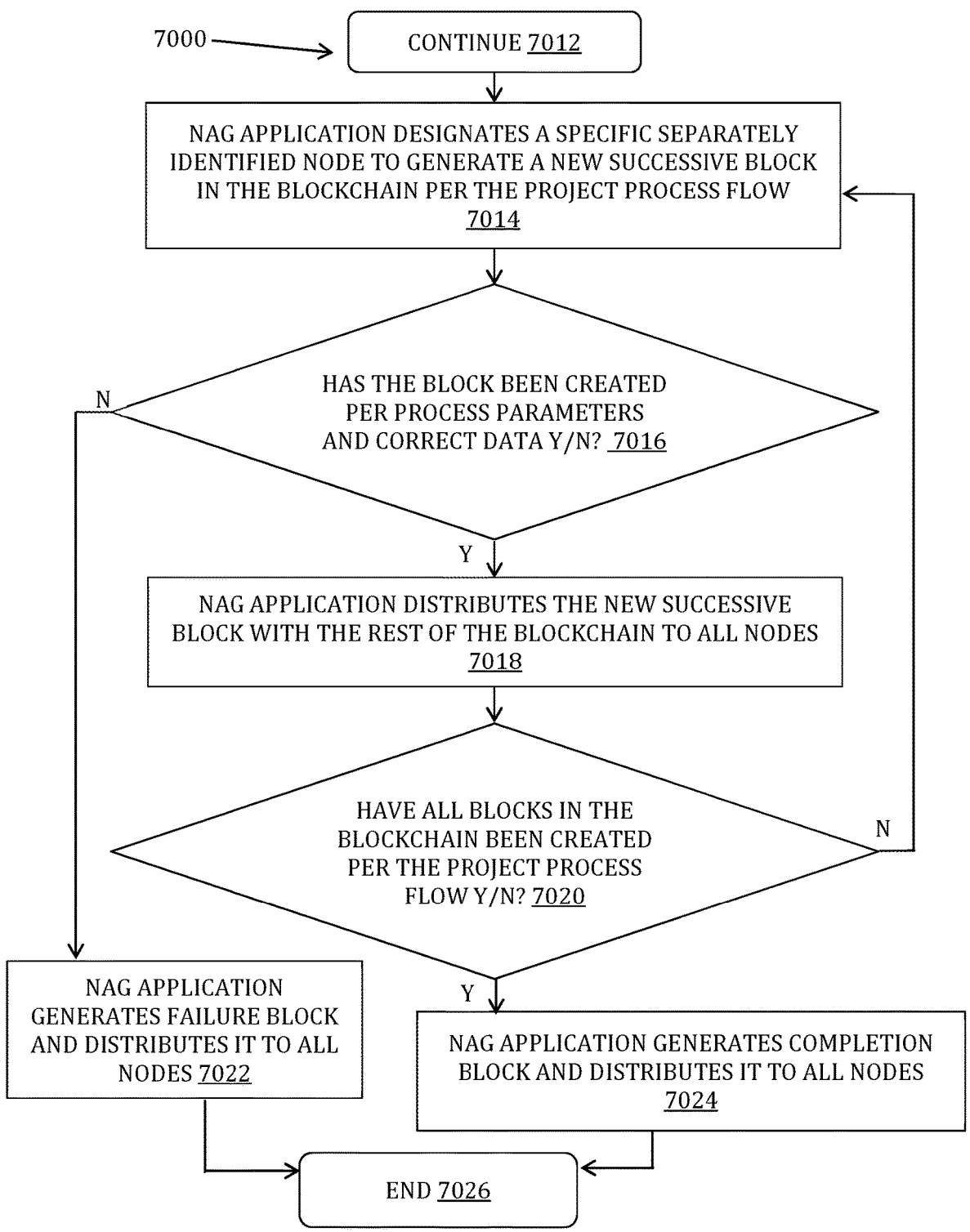

FIGS. 21-22 illustrates a flowchart 7000 depicting a process for generating project process flow data in a genesis block 34 according to FIGS. 18-20. The process begins with START 7002. In step 7004, a hardware device generates a digital or analog signal (hardware data) triggering a NAG application 128 to initiate the blockchain process. In step 7006, the NAG application 128 contacts NAG data store 52 to access a rule database to identify project process flow data appropriate for the detected hardware data. In step 7008, genesis block 110 is generated by a node in distributed network 130 including project process flow data 108. In step 7010, the NAG application loads and/or executes project process flow data from the genesis block 110 to create all of the blocks 2-6 required in the project process flow 108 as well as completion block 7 to conclude the process. The process continues in step 7012 into FIG. 22. In step 7014, NAG application 128 then designates which node is to generate each successive new block in the project process flow 108 in the blockchain 126. In step 7016, NAG application 128 determines whether the block has been created with correct parameters per the project process data 108. If the block has not been created with correct data or other specified parameters, in step 7022, NAG application 128 generates failure block 76 and distributes it to all nodes in the network. If the new block has been created with correct data, the process proceeds to step 7018 where the NAG application 128 distributes the new successive block to all nodes within distributed network 130 to add to the blockchain 126. In step 7020, NAG application 128 determines whether all blocks in blockchain 126 have been created per project process flow data 108. If all blocks have not been created, the process returns to step 7014. If all blocks have been created per project process flow data, the process proceeds to step 7024 where NAG application 128 generates the completion block and distributes it to all nodes in network 128. The process then ENDS in step 7026.

Figure 23:
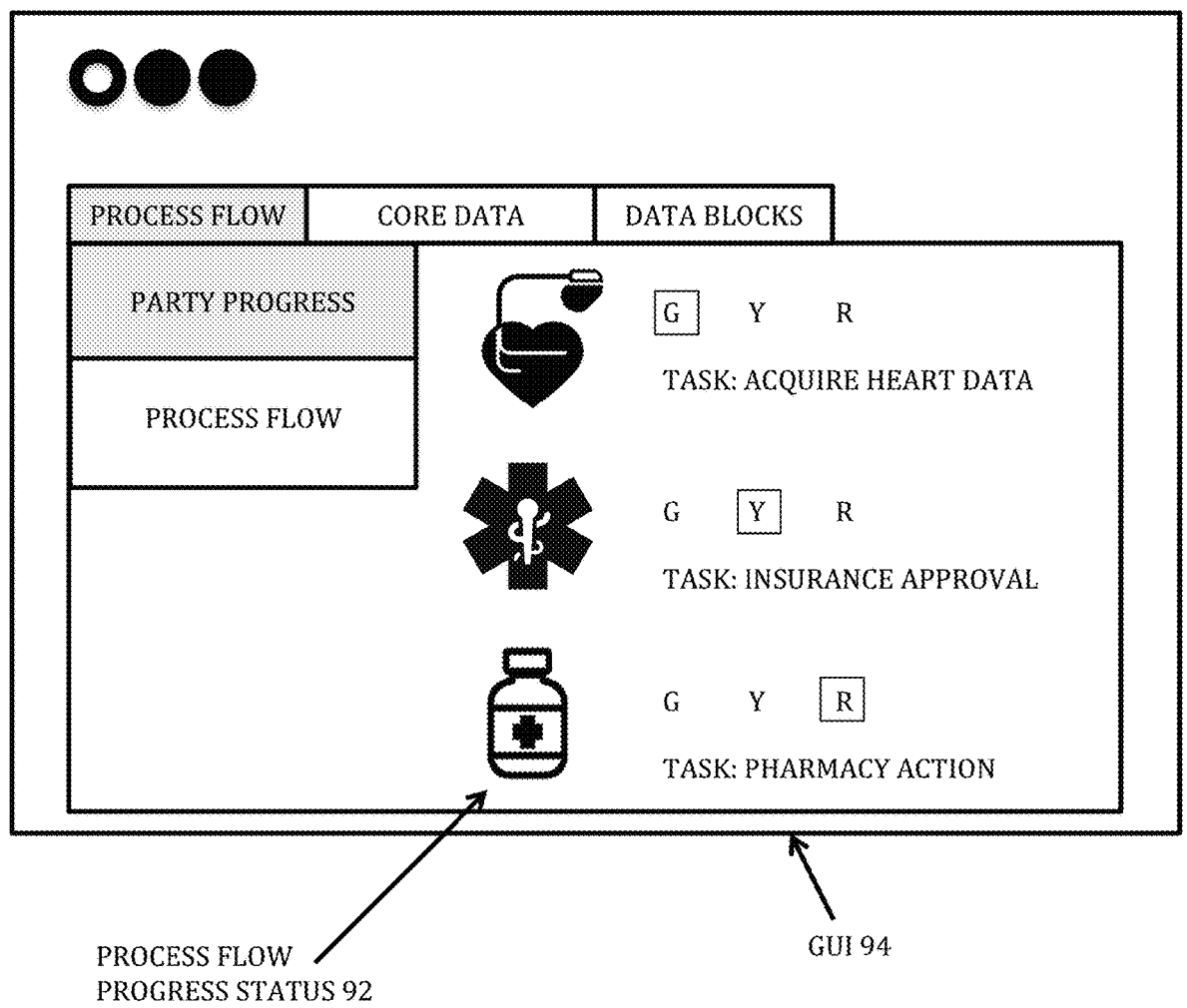
FIG. 23 depicts a Graphical User Interface (GUI) displaying a project process flow as specified within the genesis block.

FIG. 23 depicts a Graphical User Interface (GUI) 94 displaying a project process flow as specified within the genesis block 110. GUI 94 provides an exemplary holistic user interface for a user to monitor the execution of the project process flow data 108 by NAG application 128. GUI 94 includes three exemplary tabs for process flow information, core data information, and data blocks. Under the party progress selection of the process flow tab, process flow progress status 92 is provided. In this example, three parties are shown, the patient as identified by the heart and pacemaker, a six-pronged cross with the rod of Asclepius to identify a insurer and a medicine bottle to identify a pharmacist. Here, each party is shown with a task to complete in the form of making a block for the blockchain. Here the patient must provide heart data, the insurer must provide insurance approval, and the pharmacist must provide pharmacy action. The status of the completion of these blocks is signified by RED (R) for failed, YELLOW (Y) for in progress, and GREEN (G) for completed. In this GUI a user can readily see the status of the various parties and the completion of their blocks and what task those blocks relate to.

Figure 24:
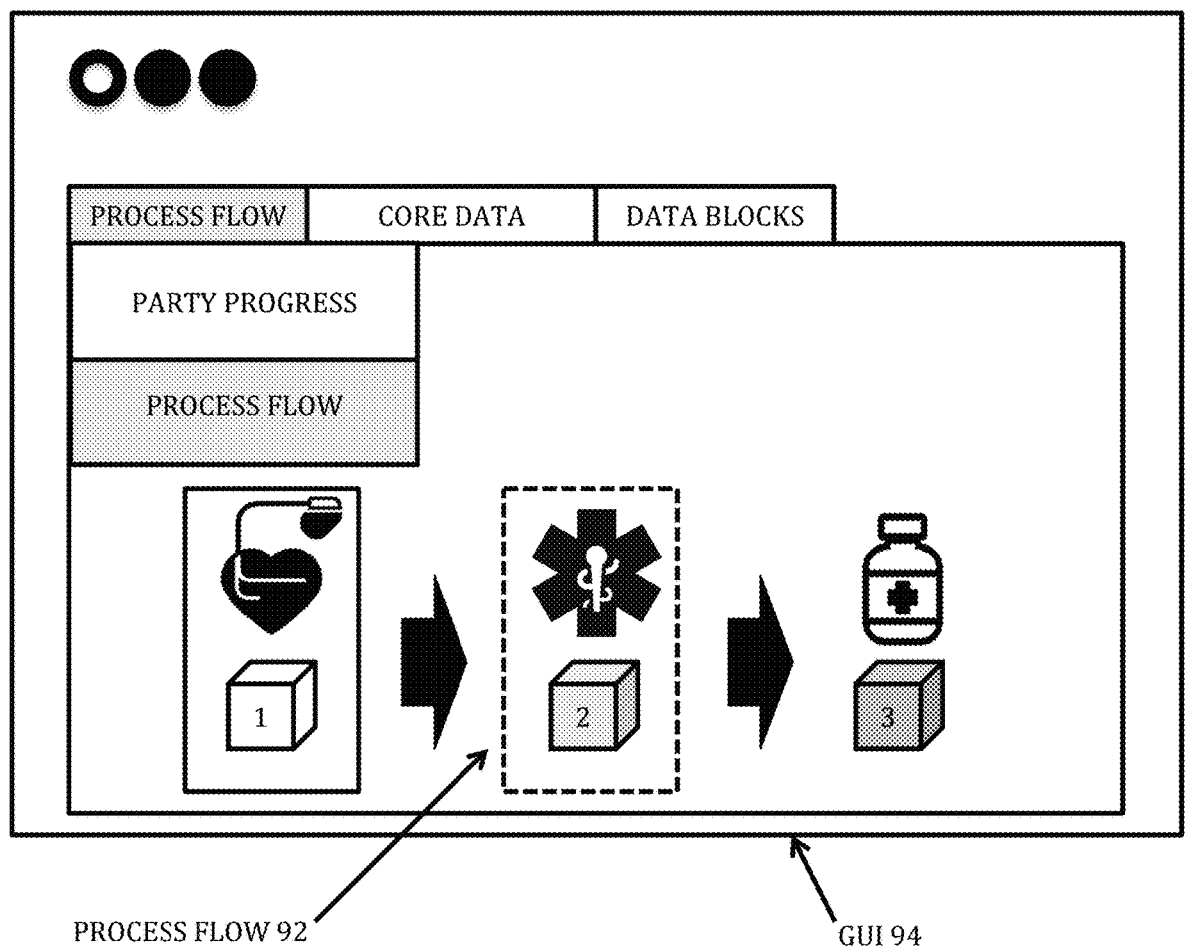
FIG. 24 depicts a Graphical User Interface (GUI) displaying a project process flow as specified within the genesis block.

FIG. 24 depicts a Graphical User Interface (GUI) 94 displaying a project process flow as specified within the genesis block 110. Under the process flow selection of the process flow tab, a project process flow diagram 92 is shown. A solid lined box surrounds the patient heart symbol and block 1 showing that the genesis block 110 was created. A solid arrow shows the process has moved onto the creation of the second block 2 by the insurance provided as signified by the dashed lined box. The arrow then proceeds to the creation of the third block in the blockchain which has not been created as symbolized by no lined box surrounding the pharmacy symbol and third block. In this screen a user can readily see the overall process flow and the status of each party.

Figure 25:
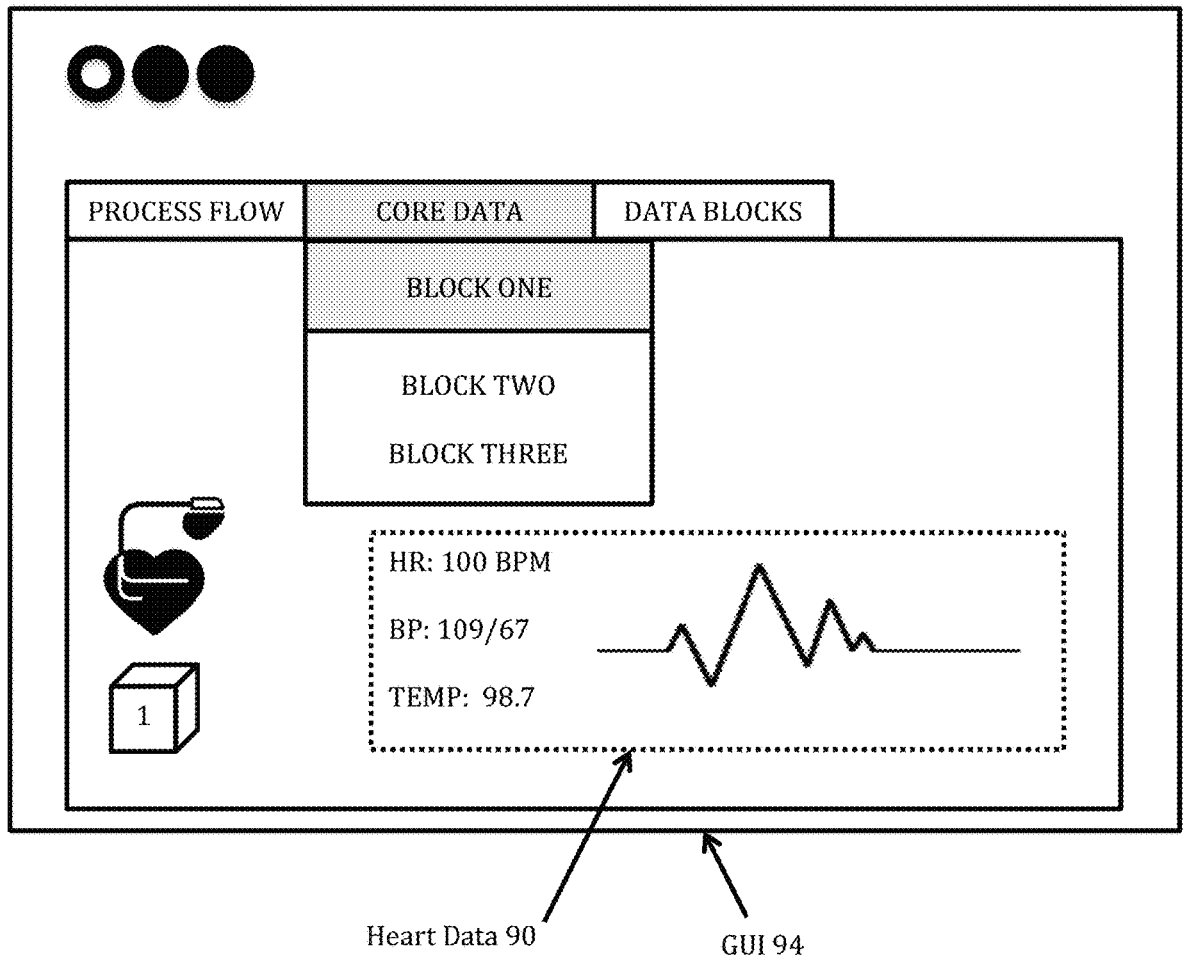
FIG. 25 depicts a Graphical User Interface (GUI) displaying the core data of a first block, the genesis block, within a blockchain.

FIG. 25 depicts a Graphical User Interface (GUI) 94 displaying the core data 90 of a first block, the genesis block, within a blockchain. In this screen a user can select one of three blocks to see what the core data is provided in each block. In this example, genesis block 1 is shown along with the core heart data 90.

Figure 26:
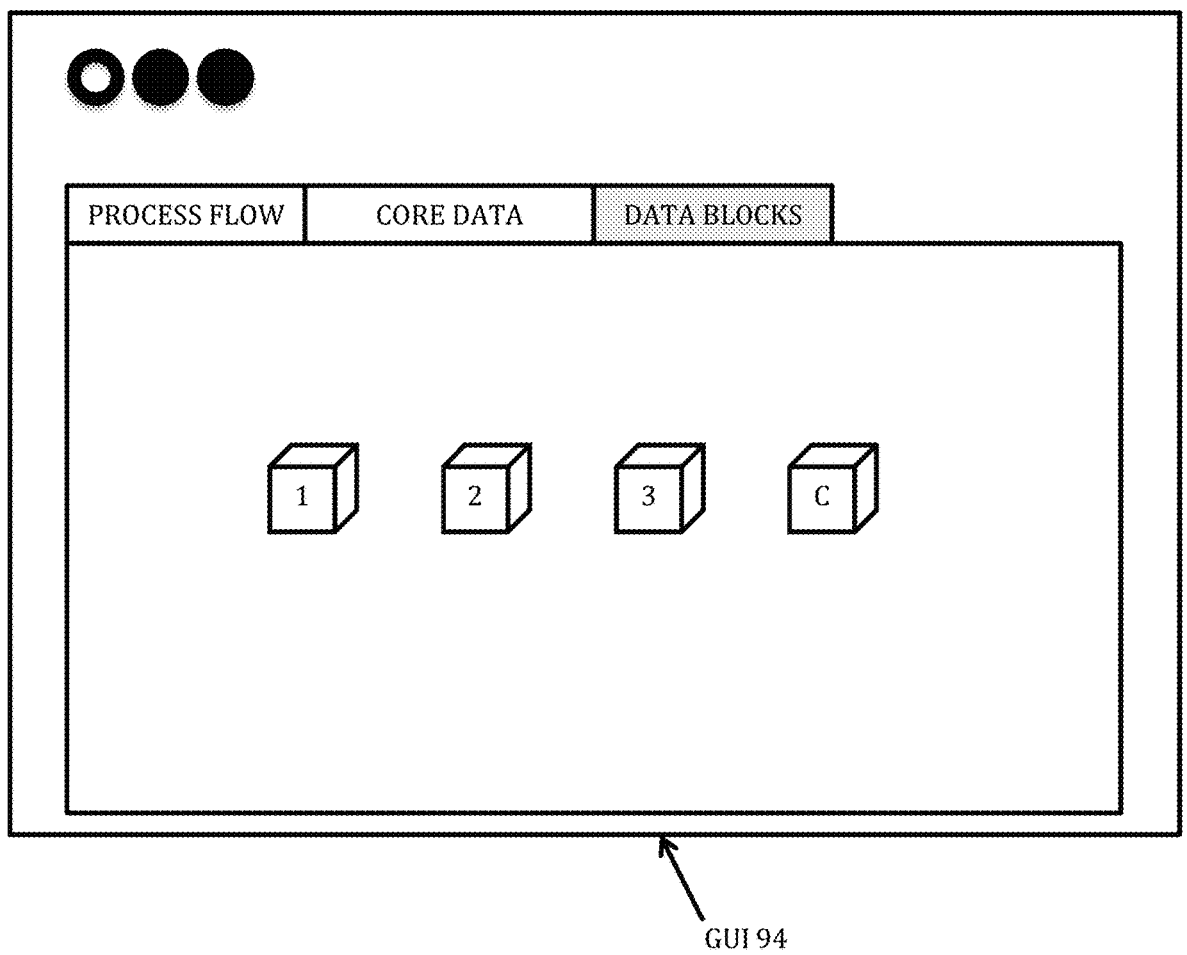
FIG. 26 depicts a Graphical User Interface (GUI) displaying all of the blocks within a blockchain.

FIG. 26 depicts a Graphical User Interface (GUI) 94 displaying all of the blocks within a blockchain. In this screen, a user can view each block in the block chain and can click on each block to view the core data, the hash, and the hash of the previous block. In this screen, the NAG application could highlight certain blocks in red to designate a tampered block or a corrupted block to alert the user.

While the invention has been shown and described with reference to a particular embodiment thereof, it will be understood to those skilled in the art, that various changes in form and details may be made therein without departing from the spirit and scope of the invention.

The invention claimed is:

1. A non-transitory computer-readable storage medium containing instructions for regulating operation of a distributed computer network to create new blockchain blocks according to a predefined sequential order of network nodes based on data stored within a blockchain, comprising:
    utilizing a network node of a distributed network to access a ledger stored within a blockchain to identify an individual node of a distributed network to generate a new blockchain block for addition to the blockchain, wherein the ledger specifies a sequential order in which individual identified nodes of a distributed network generate and append new blockchain blocks to the blockchain before those new blockchain blocks are generated;
    generating new blockchain blocks on the distributed network with the individual identified nodes specified in the ledger and in the sequential order specified in the ledger; and
    appending the new blockchain blocks to the blockchain after the new blockchain blocks have been generated.

2. The non-transitory computer-readable storage medium of claim 1, wherein the ledger specifies a type of data to be entered into each new blockchain block, wherein the type of data includes dates, times, financial values, approval or rejection information, product information, scientific information, medical information, insurance information, wherein verification logic determines whether each new blockchain block contains the type of data specified for the data entry within the ledger, wherein the ledger designates a single node of the distributed network to generate each new individual blockchain block.

3. The non-transitory computer-readable storage medium of claim 1, wherein the blockchain is a finite blockchain with a limited number of blockchain blocks, the blockchain further comprising a completion blockchain block appended to the blockchain when all data entries specified within the ledger have been added to the blockchain in the form of the new blockchain blocks, thereby completing the sequential order, wherein the completion blockchain block terminates the blockchain.

4. The non-transitory computer-readable storage medium of claim 1, further comprising:
    monitoring execution of the sequential order to generate new blockchain blocks by the distributed network with a cloud-based application by determining whether the separately identified nodes generate new blockchain blocks identified in the ledger for appending to the blockchain within a specified period of time; and
    generating a failure blockchain block when one of the separately identified nodes fails to generate a blockchain block identified in the ledger within the specific period of time and appending the failure blockchain block to the blockchain.

5. The non-transitory computer-readable storage medium of claim 1, wherein utilizing a network node of a distributed network to access a ledger includes interrogating the ledger with an agent executing on the network node to determine which node of the distributed network will generate the new blockchain block based on data within the ledger.

6. The non-transitory computer-readable storage medium of claim 1, further comprising:
    receiving a signal from an electrical device with the network node that triggers creation of the ledger through selecting a ledger from a rule base that corresponds to the signal; and
    storing the ledger within the blockchain.

7. A non-transitory computer-readable storage medium containing instructions for regulating the creation of new blockchain blocks by nodes of a distributed computer network, comprising:
    executing computer instructions to generate new blockchain blocks for addition to a blockchain according to a sequential order of network nodes specified within a blockchain block of the blockchain to which the new blockchain blocks are going to be appended, wherein the sequential order of network nodes identifies one specific network node of a distributed network that will generate each new individual blockchain block before the new individual blockchain block is generated; and generating a new blockchain block with a single network node selected from the sequential order of network nodes for the new blockchain block.

8. The non-transitory computer-readable storage medium of claim 7, wherein the sequential order of network nodes is stored within a ledger contained within the blockchain, wherein the ledger contains a listing of all new blockchain blocks to be generated and appended to the blockchain along with a listing of which one specific network node of the distributed network will generate each new blockchain block.

9. The non-transitory computer-readable storage medium of claim 8, wherein the ledger is stored within a genesis blockchain block of the blockchain, wherein the blockchain is stored on one or more nodes of the distributed network.

10. The non-transitory computer-readable storage medium of claim 8, wherein the blockchain is a finite blockchain that has a limited number of blockchain blocks specified within ledger.

11. The non-transitory computer-readable storage medium of claim 10, wherein the finite blockchain ends with a completion blockchain block that terminates the finite blockchain when all new blockchain blocks specified within the ledger have been generated and appended to the finite blockchain.

12. The non-transitory computer-readable storage medium of claim 8, wherein the ledger specifies a type of data to be stored within each new blockchain block, wherein the type of data includes dates, times, financial values, approval or rejection information, product information, scientific information, medical information, insurance information, wherein verification logic determines whether each new blockchain block contains the type of data specified for the data entry within the ledger.

13. The non-transitory computer-readable storage medium of claim 7, wherein the sequential order of nodes includes a listing of more than one network node for generating the new blockchain blocks.

14. The non-transitory computer-readable storage medium of claim 13, wherein each network node is associated with a different entity, wherein each entity may be a financial entity, a medical entity, a manufacturing entity, or an insurance entity.

15. The non-transitory computer-readable storage medium of claim 7, further comprising:
monitoring execution of the generation of the new blockchain with a cloud-based application by determining whether the network nodes generate new blockchain blocks for appending to the blockchain according to the sequential order within a specified period of time;
generating a failure blockchain block when any one of the network nodes fails to generate a particular blockchain block identified in the sequential order within the specific period of time; and
appending the failure blockchain block to the blockchain.

16. A non-transitory computer-readable storage medium containing instructions to regulate the creation of new blockchain blocks within a distributed network, comprising:
accessing a new blockchain block sequential-order ledger contained within a blockchain stored on a node of a distributed network, wherein the new blockchain sequential-order ledger specifies a predetermined sequential order in which different individual network nodes of a distributed network create each new blockchain block for appending to the blockchain before new blockchain blocks are created by the nodes; and
creating new blockchain blocks that are appended to the blockchain with specific network nodes of the distributed network in an order according to the predetermined sequential order.

17. The non-transitory computer-readable storage medium of claim 16, wherein the new blockchain block sequential-order ledger contains a listing of all new blockchain blocks to be generated and appended to the blockchain along with a listing of which specific network node of the distributed network will generate each new blockchain block.

18. The non-transitory computer-readable storage medium of claim 17, wherein the new blockchain block sequential-order ledger is stored within a genesis blockchain block of the blockchain, wherein the new-blockchain block sequential-order ledger includes a listing of more than one network node for generating the new blockchain blocks.

19. The non-transitory computer-readable storage medium of claim 18, wherein the new blockchain block sequential-order ledger specifies a type of data to be stored within each new blockchain block, wherein the type of data includes dates, times, financial values, approval or rejection information, product information, scientific information, medical information, insurance information, wherein verification logic determines whether each new blockchain block contains the type of data specified for the data entry within the new blockchain block sequential-order ledger, wherein each network node is associated with a different entity, wherein each entity may be a financial entity, a medical entity, a manufacturing entity, or an insurance entity.

20. The non-transitory computer-readable storage medium of claim 18, wherein the new-blockchain block sequential-order ledger identifies a first single specific network node to generate a first new blockchain block for appending to the genesis blockchain block, wherein the new blockchain block sequential-order ledger identifies a second single specific network node to generate a second new blockchain block for appending to the first blockchain block, and wherein the new blockchain block sequential-order ledger identifies a third single specific network node of a distributed network to generate a third new blockchain block for appending to the second blockchain block.

21. The non-transitory computer-readable storage medium of claim 17, wherein the blockchain is a finite blockchain having a limited number of blockchain blocks specified within the new blockchain block sequential-order ledger, wherein the finite blockchain ends with a completion blockchain block terminating the finite blockchain when all other new blockchain blocks specified within the new blockchain block sequential-order ledger have been generated and appended to the finite blockchain.

22. The non-transitory computer-readable storage medium of claim 16, further comprising:
monitoring execution of the generation of the new blockchain blocks with a cloud-based application by determining whether the network nodes generate new blockchain blocks for appending to the blockchain according to the predetermined sequential order within a specified period of time;

generating a failure blockchain block when any one of the network nodes fails to generate a particular blockchain block identified in the predetermined sequential order within the specific period of time; and appending the failure blockchain block to the blockchain.

* * * * *